United States Patent
Wang et al.

(10) Patent No.: US 12,063,354 B2
(45) Date of Patent: Aug. 13, 2024

(54) VIDEO DECODING METHOD AND APPARATUS, VIDEO CODING METHOD AND APPARATUS, DEVICE, AND STORAGE MEDIUM

(71) Applicant: Tencent Technology (Shenzhen) Company Limited, Guangdong (CN)

(72) Inventors: Yingbin Wang, Shenzhen (CN); Xiaozhong Xu, Shenzhen (CN); Shan Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 120 days.

(21) Appl. No.: 17/895,729

(22) Filed: Aug. 25, 2022

(65) Prior Publication Data

US 2022/0417504 A1 Dec. 29, 2022

Related U.S. Application Data

(63) Continuation of application No. PCT/CN2021/106598, filed on Jul. 15, 2021.

(30) Foreign Application Priority Data

Jul. 29, 2020 (CN) .......................... 202010747005.6

(51) Int. Cl.
*H04N 19/105* (2014.01)
*H04N 19/136* (2014.01)
(Continued)

(52) U.S. Cl.
CPC ......... *H04N 19/105* (2014.11); *H04N 19/136* (2014.11); *H04N 19/176* (2014.11);
(Continued)

(58) Field of Classification Search
None
See application file for complete search history.

(56) References Cited

U.S. PATENT DOCUMENTS

2006/0067759 A1* 3/2006 Osaka .................. G03G 21/046
399/366
2015/0229971 A1 8/2015 Ye et al.
(Continued)

FOREIGN PATENT DOCUMENTS

CN 107071450 A 8/2017
CN 110636302 A 12/2019
(Continued)

OTHER PUBLICATIONS

First Office Action (Notice of Reasons for Refusal) for corresponding Japanese application No. 2022-559390 dated Oct. 19, 2023, 5p, in Japanese language.
English language translation of Notice of Reasons for Refusal for corresponding Japanese application No. 2022-559390 dated Oct. 19, 2023, 6p.
Lin, Tao et al., "AHG8: P2M based dual-coder extension of HEVC," Joint Collaborative Team on Video Coding (JCT-VC) of ITU-T SG16 WP3 and ISO/IEC JTC1/SG29/WG11, 12th Meeting, Jan. 23, 2013, 8p, CH.
(Continued)

*Primary Examiner* — Xiaolan Xu
(74) *Attorney, Agent, or Firm* — Crowell & Moring LLP

(57) ABSTRACT

Video coding/decoding can improve the uniformity of pixel strings and provide for increased coding and decoding efficiency. String length information of a current string from a bit stream is decoded. Based on the string length information and a determined string length resolution (SLR) of the current string a string length of the current string is determined. By using the SLR as a basis for dividing and decoding the pixel string, the length of the pixel string in a coding block can be limited to a multiple of the SLR, which improves uniformity of pixel strings, so that a decoder end can perform decoding with memory alignment, thereby improving decoding efficiency of the pixel strings.

20 Claims, 9 Drawing Sheets

(51) Int. Cl.
  *H04N 19/176* (2014.01)
  *H04N 19/182* (2014.01)
  *H04N 19/186* (2014.01)
  *H04N 19/50* (2014.01)
  *H04N 19/70* (2014.01)

(52) U.S. Cl.
  CPC ......... *H04N 19/182* (2014.11); *H04N 19/186* (2014.11); *H04N 19/50* (2014.11); *H04N 19/70* (2014.11)

(56) References Cited

U.S. PATENT DOCUMENTS

2016/0330455 A1* 11/2016 Lin .................. H04N 19/11
2019/0110079 A1 4/2019 Lin et al.

FOREIGN PATENT DOCUMENTS

| CN | 111131826 A | 5/2020 |
| CN | 111866512 A | 10/2020 |
| CN | 112543332 A | 3/2021 |
| EP | 3 035 683 A1 | 6/2016 |
| JP | 2016-532377 A | 10/2016 |
| WO | WO 2021/239160 A1 | 12/2021 |
| WO | WO 2022/022297 A1 | 2/2022 |

OTHER PUBLICATIONS

International Search Report and Written Opinion for priority application No. PCT/CN2021/106598 dated Oct. 12, 2021, 10p, in Chinese language.
English Language translation of the International Search Report for priority application No. PCT/CN2021/106598 dated Oct. 12, 2021.
Jhu, Hong-Jneng et al., "CE2-1.2: Fixed-length binarization of palette escape value", Joint Video Experts Team (JVET) of ITU-T SG 16 WP 3 and ISO/IEC JTC 1/SC 29/WG 11, 17$^{th}$ Meeting, Jan. 17, 2020, 3p. BE.
European Search Report for corresponding application No. EP 21848927.6 dated May 4, 2023, 13p.
Zou, Feng et al., "Pixel-based 1D Dictionary Coding", Joint collaborative Team on Video Coding (JCT-VC) of ITU-TSG 16 WP3 and ISO/IEC JTC1/SC29/WG11, 17$^{th}$ Meeting, Apr. 4, 2014, 5p, ES.
Wang, W. et al., "AHG8: String match in coding of screen content", Joint collaborative Team on Video Coding (JCT-VC) of ITU-TSG16 WP3 and ISO/IE JTC1/SC29/WG11, 17$^{th}$ Meeting, Apr. 4, 2014, 12p, ES.

* cited by examiner (a) Spatial domain    (b) Time domain

VIDEO DECODING METHOD AND APPARATUS, VIDEO CODING METHOD AND APPARATUS, DEVICE, AND STORAGE MEDIUM

RELATED APPLICATION

This application claims priority to PCT/CN2021/106598, filed on Jul. 15, 2021, published as WO 2022022297A1, and entitled "VIDEO DECODING METHOD AND APPARATUS, VIDEO ENCODING METHOD AND APPARATUS, DEVICE, AND STORAGE MEDIUM," which claims priority to Chinese Patent Application No. 202010747005.6, filed on Jul. 29, 2020 and entitled "VIDEO DECODING METHOD AND APPARATUS, VIDEO CODING METHOD AND APPARATUS, DEVICE, AND STORAGE MEDIUM," each of which are incorporated herein by reference in their entirety.

FIELD OF THE TECHNOLOGY

This application relates to the field of video coding and decoding technologies, and in particular, to a video decoding method and apparatus, a video coding method and apparatus, a device, and a storage medium.

BACKGROUND OF THE DISCLOSURE

In current video coding and decoding standards, such as versatile video coding (VVC) and audio video coding standard 3 (AVS3), an intra string copy (ISC) technology is used.

In the related ISC technology, a coding block is partitioned into a series of pixel strings or unmatched pixels in a scan order, meaning that the coding block is allowed to be partitioned into pixel strings with a pixel length of any integer. For example, an unmatched pixel may be considered as a pixel string with a length of 1. The length of the pixel string may be any positive integer such as 1, 2, 3, or 4. This can result in irregular pixel strings and low decoding efficiency.

SUMMARY

Embodiments of this application provide a video decoding method and apparatus, a video coding method and apparatus, a device, and a storage medium, which can improve uniformity of pixel strings and decoding efficiency of the pixel strings. The technical solutions are as follows.

In one embodiment, a video decoding method is provided. The method is performed by an electronic device and includes:
  decoding string length information of a current string from a bit stream, the string length information including information related to a string length of the current string;
  determining a string length resolution (SLR) of the current string; and
  determining the string length of the current string according to the string length information and the SLR.

In another embodiment, a video coding method is provided. The method is performed by an electronic device and includes: determining an SLR of a current string; determining string length information of the current string based on a string length and the SLR of the current string, the string length information including information related to the string length of the current string; and coding the string length information.

In some embodiments, the SLR of the current string is a first reference value; or SLRs of strings included in an image sequence to which the current string belongs are the same, and the SLR is coded and then added to a sequence header of the image sequence to which the current string belongs; or SLRs of strings included in an image to which the current string belongs are the same, and the SLR is coded and then added to an image header of the image to which the current string belongs; or SLRs of strings included in a patch to which the current string belongs are the same, and the SLR is coded and then added to a patch header of the patch to which the current string belongs; or SLRs of strings included in a largest coding unit (LCU) to which the current string belongs are the same, and the SLR is coded and then added to coding information of the LCU to which the current string belongs; or SLRs of strings included in a coding unit (CU) to which the current string belongs are the same, and the SLR is coded and then added to coding information of the CU to which the current string belongs; or the SLR of the current string is coded and then added to coding information of the current string; the SLR of the current string is determined according to a size of a decoding block to which the current string belongs; or the SLR of the current string is determined according to a color component and a chroma format corresponding to the current string; when a number of decoded strings in the CU to which the current string belongs is greater than or equal to a first threshold, the SLR of the current string is a second reference value; or when a number of decoded and unmatched pixels in the CU to which the current string belongs is greater than or equal to a second threshold, the SLR of the current string is a third reference value; or when a number of undecoded pixels in the CU to which the current string belongs is less than or equal to a third threshold, the SLR of the current string is a fourth reference value.

In some embodiments, the string length information includes a string length code of the current string; and the determining string length information of the current string based on a string length and the SLR of the current string includes: dividing the string length of the current string by the SLR to obtain the string length code of the current string.

In some embodiments, the string length information includes a code of a number of remaining pixels in a coding block to which the current string belongs after the current string is coded; the determining string length information of the current string based on a string length and the SLR of the current string includes: acquiring a total number of pixels of the coding block to which the current string belongs; acquiring a number of coded pixels of the coding block to which the current string belongs; determining, based on the total number of pixels, the number of coded pixels, and the string length of the current string, a number of remaining pixels in the coding block to which the current string belongs after the current string is coded; and dividing the number of remaining pixels after the current string is coded by the SLR to obtain the code of the number of remaining pixels.

In some embodiments, the string length information includes a remaining string flag, the remaining string flag being used for indicating whether the current string is the last string in the coding block to which the current string belongs; and the determining string length information of the current string based on a string length and the SLR of the current string includes: determining that the remaining string flag corresponding to the current string is a first value when the current string is the last string, the first value being used for indicating that the current string is the last string in the coding block to which the current string belongs; coding the remaining string flag corresponding to the current string; determining the number of remaining pixels of the coding block to which the current string belongs based on the total number of pixels in the coding block to which the current string belongs, the number of coded pixels, and the string length of the current string when the current string is not the last string; dividing the number of remaining pixels by the SLR to obtain a code of the number of remaining pixels in the coding block to which the current string belongs after the current string is coded; determining that the remaining string flag corresponding to the current string is a second value in, the second value being used for indicating that the current string is not the last string in the coding block to which the current string belongs; and coding the remaining string flag corresponding to the current string; the string length information further including the code of the number of remaining pixels; or the string length information further including the code of the number of remaining pixels minus a first value. For example, the first value is 1.

In some embodiments, the method further includes: determining an allowable SLR set, the SLR set including at least one set of correspondences between index values and SLRs; and coding a first index value, the first index value being an index value corresponding to the SLR of the current string.

In some embodiments, the SLR included in the SLR set includes at least one of the following: one or more reference values; a width of a current CU; or a height of the current CU.

In some embodiments, when the current CU is scanned along a horizontal direction, the SLR set includes the width of the current CU; and when the current CU is scanned along a vertical direction, the SLR set includes the height of the current CU.

In some embodiments, the method further includes: coding a string matching flag corresponding to the current string, the string matching flag being used for indicating whether the current string includes an unmatched pixel; when the current string includes the unmatched pixel, the string length of the current string is N, N being the SLR of the current string.

In some embodiments, when the string length of the current string is greater than N, the current string does not include the unmatched pixel, and the corresponding string matching flag is not required to be coded for the current string; and when the string length of the current string is equal to N, the string matching flag corresponding to the current string is coded; the string matching flag being used for indicating whether the current string includes the unmatched pixel, and N being the SLR of the current string.

In some embodiments, when the current string includes the unmatched pixel, the method further includes: coding an unmatched pixel flag included in the current string corresponding to each pixel, the unmatched pixel flag being used for indicating whether the pixel is an unmatched pixel; or coding a number of unmatched pixels included in the current string and an unmatched pixel location flag of each unmatched pixel, the unmatched pixel location flag being used for indicating a location of the unmatched pixel in the current string; or determining that each pixel included in the current string is an unmatched pixel.

In some embodiments, the method further includes: determining a reference string of the current string; when the current string does not include the unmatched pixel; determining a string vector of the current string based on the reference string of the current string; and coding the string vector of the current string.

In some embodiments, the method further includes: determining a reference string of the current string when the current string includes the unmatched pixel; determining a string vector of the current string based on the reference string of the current string; coding the string vector of the current string; coding a pixel value of the unmatched pixel in the current string and then adding the unmatched pixel to the bit stream; and skipping coding a matched pixel in the current string.

In some embodiments, the method further includes: determining a reference string of the current string when the current string includes the unmatched pixel; determining a string vector of the current string based on the reference string of the current string; coding the string vector of the current string; acquiring a predicted residual of the unmatched pixel in the current string; coding a predicted residual of the unmatched pixel and then adding the unmatched pixel to the bit stream; and skipping coding a matched pixel in the current string.

In another embodiment, a video decoding apparatus is provided, including:
  a string information decoding module, configured to decode string length information of a current string from a bit stream, the string length information including information related to a string length of the current string;
  a resolution determination module, configured to determine an SLR of the current string; and
  a string length determination module, configured to determine the string length of the current string according to the string length information and the SLR.

In another embodiment, a video coding apparatus is provided, including:
  a resolution determination module, configured to determine an SLR of a current string;
  a string information determination module, configured to determine string length information of the current string based on a string length and the SLR of the current string, the string length information including information related to the string length of the current string; and
  a string information coding module, configured to code the string length information.

In another embodiment, a computer device is provided. The computer device includes a processor and a memory, the memory storing at least one instruction, at least one program, a code set, or an instruction set, the at least one instruction, the at least one program, the code set, or the instruction set being loaded and executed by the processor to implement the above video decoding method.

In another embodiment, a computer device is provided. The computer device includes a processor and a memory, the memory storing at least one instruction, at least one program, a code set, or an instruction set, the at least one instruction, the at least one program, the code set, or the instruction set being loaded and executed by the processor to implement the above video coding method.

In another embodiment, a non-transitory computer-readable storage medium is provided, storing at least one instruction, at least one program, a code set, or an instruction set, the at least one instruction, the at least one program, the code set, or the instruction set being loaded and executed by a processor to implement the above video decoding method.

In another embodiment, a non-transitory computer-readable storage medium is provided, storing at least one instruction, at least one program, a code set, or an instruction set, the at least one instruction, the at least one program, the code set, or the instruction set being loaded and executed by a processor to implement the above video coding method.

In another embodiment, a computer program product or a computer program is provided, including computer instructions, and the computer instructions are stored in a non-transitory computer-readable storage medium. A processor of a computer device reads the computer instructions from the non-transitory computer-readable storage medium, and executes the computer instructions to cause the computer device to perform the above video decoding method.

In another embodiment, a computer program product or a computer program is provided, including computer instructions, and the computer instructions are stored in a non-transitory computer-readable storage medium. A processor of a computer device reads the computer instructions from the non-transitory computer-readable storage medium, and executes the computer instructions to cause the computer device to perform the above video coding method.

The embodiments in this application may improve the uniformity of pixel strings and improve coding and decoding efficiency.

The string length information is first decoded from the bit stream, the SLR of the current string is determined, and then the string length of the current string is determined according to the string length information and the SLR. By using the SLR as a division and decoding basis for pixel strings, a length of a pixel string in a coding block can be limited to a multiple of the SLR, which improves uniformity of the pixel strings, so that a decoder end can perform decoding under a condition of memory alignment, thereby improving decoding efficiency of the pixel strings.

DESCRIPTION OF EMBODIMENTS

The objectives, technical solutions, and advantages of this application are described in below with reference to the accompanying drawings.

Figure 1:
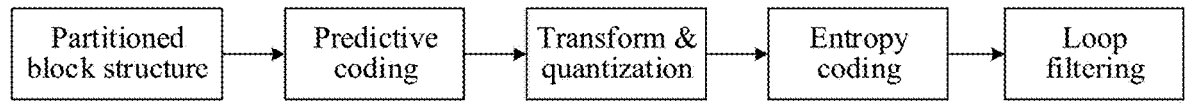
FIG. 1 is an example flowchart of a video coding process according to an embodiment of this application.

Before embodiments of this application are described, a video coding technology is briefly described with reference to FIG. 1. FIG. 1 is an example flowchart of a video coding process.

A video signal is an image sequence including a plurality of frames. The frame is a representation of spatial information of the video signal. For example, in a YUV mode, a frame includes one luminance sample matrix (Y) and two chroma sample matrices (Cb and Cr). From a perspective of an obtaining manner of a video signal, the obtaining manner may be divided into two manners: camera capturing and computer generation. Due to different statistical characteristics of the two manners, corresponding compression coding manners may also be different.

In some video coding technologies, such as an H.265/high efficiency video coding (HEVC) standard, an H.266/versatile video coding (VVC) standard, and an audio video coding standard (AVS) (such as an AVS3), a hybrid coding framework is adopted to perform the following operation and processing on an inputted original video signal.

1. Block partition structure: An inputted image is partitioned into a plurality of non-overlapping to-be-processed units, and similar operations are performed on all of the to-be-processed units. The processing unit is referred to as a coding tree unit (CTU) or a largest coding unit (LCU). The CTU may be further partitioned to obtain one or more basic CUs, which are referred to as CUs. Each CU is the most basic element in a coding process. Various coding manners for each CU are described below.

2. Predictive coding: The predictive coding includes modes such as intra prediction and inter prediction. After an original video signal is predicted by using a selected reconstructed video signal, a residual video signal is obtained. A coder end selects a most suitable predictive coding mode for a current CU from many possible predictive coding modes, and notify a decoder end of the selected predictive coding mode. The intra prediction means that a predicted signal comes from a region in a same image that has been coded and reconstructed. The inter prediction means that a predicted signal comes from another coded image (referred to as a reference image) that is different from a current image.

3. Transform & quantization: A residual video signal is transformed into a transform domain through a transform operation such as discrete Fourier transform (DFT) or discrete cosine transform (DCT), to generate a transform coefficient. A lossy quantization operation is further performed on the signal in the transform domain, which loses a specific amount of information, so that the quantized signal facilitates compressed expression. In some video coding standards, there may be more than one transform manner for selection. Therefore, the coder end selects a transform manner for the current CU and notifies the decoder end of the selected transform manner. Fineness of quantization generally depends on a quantization parameter (QP). A larger QP indicates that coefficients within a larger value range are to be quantized into a same output, which usually brings larger distortion and a lower bit rate. On the contrary, a smaller QP indicates that coefficients within a smaller value range are to be quantized into a same output, which usually causes less distortion and a higher bit rate.

4. Entropy coding or statistical coding: Statistical compression coding is performed on the quantized signal in the transform domain according to a frequency of occurrence of each value, and finally a binarized (0 or 1) compressed bit stream is outputted. In addition, entropy coding is also performed on other information generated during the coding, such as the selected mode and a motion vector, to reduce a bit rate. Statistical coding is a lossless coding manner that can effectively reduce a bit rate to express a same signal. A common statistical coding manner includes variable length coding (VLC for short) or context adaptive binary arithmetic coding (CABAC for short).

5. Loop filtering: Operations such as inverse quantization, inverse transform, and predictive compensation (reverse operations of the above operations 2 to 4) are performed on a coded image to obtain a reconstructed decoded image, that is, a reconstructed image. The reconstructed image has some information different from that in an original image as a result of quantization, resulting in distortion. The reconstructed image is filtered, for example, by using a filter such as a deblocking filter, a sample adaptive offset (SAO) filter, or an adaptive lattice filter (ALF) filter, which can effectively reduce the distortion caused by the quantization. Since the filtered reconstructed image will be used as a reference for subsequently coding images so as to predict future signals, the above filtering operation is also referred to as loop filtering, that is, a filtering operation in a coding loop.

It can be seen from the above coding process that, on the decoder end, for each CU, after a decoder obtains a compressed bit stream, entropy decoding is first performed to obtain all kinds of mode information and quantized transform coefficients. Inverse quantization and inverse transform are performed on the transformed coefficients to obtain a residual video signal. Moreover, a predicted signal corresponding to the CU can be obtained according to coding mode information that is known. Then the residual video signal may be added to the predicted signal to obtain a reconstructed signal. Finally, a loop filtering operation is performed on a reconstructed value of the decoded image to generate a final output signal.

In some video coding standards such as the HEVC, the VVC, and the AVS3, a block-based hybrid coding framework is adopted. Original video data is partitioned into a series of coding blocks by using the standards, and the video data is compressed by using video coding methods such as prediction, transform, and entropy coding. Motion compensation is a prediction method commonly used for video coding, which is to derive a predicted value of a current coding block from a coded region based on a redundancy attribute of video content in a time domain or a spatial domain. Such prediction method includes inter prediction, intra block copy (IBC) prediction, intra string copy (ISC) prediction, and the like. In implementation, these prediction methods may be used alone or in combination. For a coding block using these prediction methods, it is usually necessary to explicitly or implicitly code one or more two-dimensional displacement vectors in a bit stream, which indicates displacement of a current block (or a co-located block of the current block) relative to one or more reference blocks of the current block.

In different prediction modes and different implementations, the displacement vector may have different names. In this description, 1) the displacement vector in the inter prediction mode is referred to as a motion vector (MV for short), 2) the displacement vector in the IBC prediction mode is referred to as a block vector (BV for short), and 3) the displacement vector in the ISC prediction mode is referred to as a string vector (SV for short). The ISC is also referred to as "string prediction", "string matching", or the like.

The MV is the displacement vector used in the inter prediction mode, which points from a current image to a reference image, and a value of the vector is a coordinate offset between a current block and a reference block. The current block and the reference block are in two different images. In the inter prediction mode, motion vector prediction can be used. A motion vector predictor corresponding to the current block is obtained by predicting a motion vector of the current block. A difference between the motion vector predictor corresponding to the current block and an actual motion vector is coded and transmitted, which helps reduce bit overheads compared with directly coding and transmitting the actual motion vector corresponding to the current block. In this embodiment of this application, the motion vector predictor is a predicted value of the motion vector of the current block obtained through a motion vector prediction technology.

The BV is the displacement vector used in the IBC prediction mode, and a value of the vector is a coordinate offset between the current block and the reference block. The current block and the reference block are in the current image. In the IBC mode, block vector prediction can be used. A predicted block vector corresponding to the current block is obtained by predicting a block vector of the current block. A difference between the predicted block vector corresponding to the current block and an actual block vector is coded and transmitted, which helps reduce bit overheads compared with directly coding and transmitting the actual block vector corresponding to the current block. In this embodiment of this application, the predicted BV is a predicted value of the BV of the current block obtained through a BV prediction technology.

The SV is the displacement vector used in the ISC prediction mode, and a value of the vector is a coordinate offset between a current string and a reference string. The current string and the reference string are in the current image. In the ISC mode, string vector prediction can be used. A predicted string vector corresponding to the current string is obtained by predicting a string vector of the current string. A difference between the predicted string vector corresponding to the current string and an actual string vector is coded and transmitted, which helps reduce bit overheads compared with directly coding and transmitting the actual string vector corresponding to the current string. In this embodiment of this application, the predicted string vector is a predicted value of the string vector of the current string obtained through a string vector prediction technology.

Different prediction modes are described below.

I. Inter Prediction Mode

Figure 2:
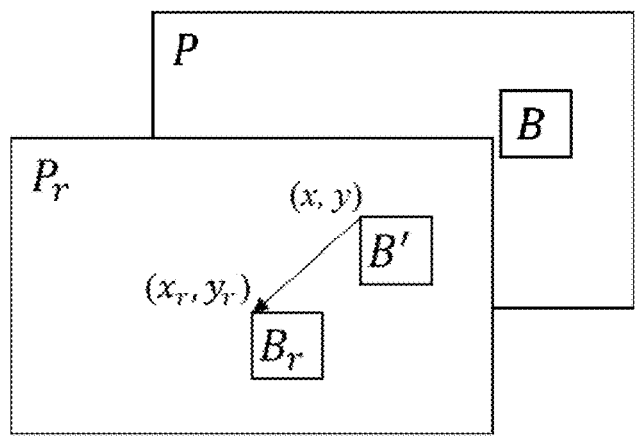
FIG. 2 is a schematic diagram of an inter prediction mode according to an embodiment of this application.

As shown in FIG. 2, the inter prediction is to predict, through correlation of a video in a time domain, a pixel of a current image by using a pixel of an adjacent coded image, so as to effectively remove redundancy of the video in the time domain, thereby effectively reducing bits for coding residual data. P is a current frame, Pr is a reference frame, B is a current to-be-coded block, and Br is a reference block of B. A location of B' in a Pr image is the same as a coordinate location of B in a P image, coordinates of Br are (xr, yr), and coordinates of B are (x, y). Displacement between the current to-be-coded block and the reference block of the current to-be-coded block is referred to as a motion vector (MV), that is:

$$MV=(xr-x, yr-y).$$

In view of strong correlation between adjacent blocks in the time domain or the spatial domain, bits to code the MV may be further reduced by using an MV prediction technology. In the H.265/HEVC, the inter prediction includes two MV prediction technologies: merge and advanced motion vector prediction (AMVP).

In the merge mode, a candidate MV list is established for a current prediction unit (PU), which includes 5 candidate MVs (and reference images corresponding to the MVs). The five candidate MVs are traversed to select an optimal MV having the smallest rate-distortion cost. When a coder establishes a candidate list in a same way, a coder transmits an index of the optimal MV in the candidate list. The MV prediction technology of the HEVC further has a skip mode, which is a special case of the merge mode. After the optimal MV is found in the merge mode, if the current block is substantially the same as the reference block, residual data is not required to be transmitted, while the index of the MV and a skip flag are transmitted.

Figure 3:
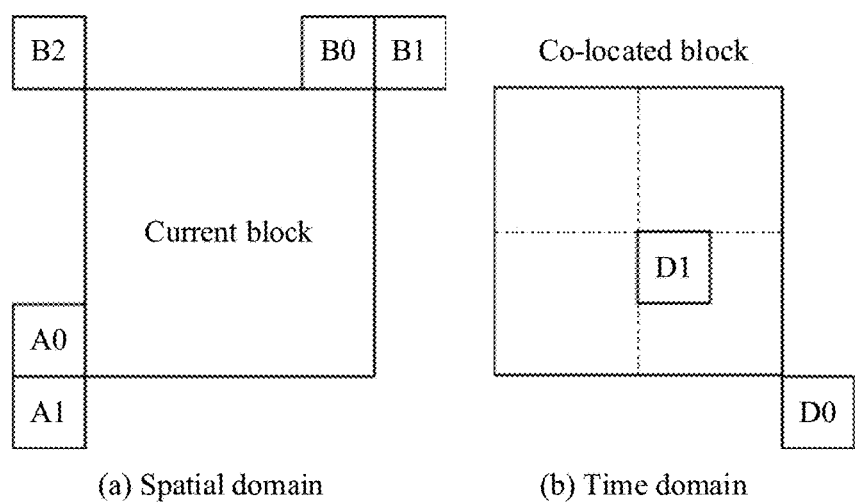
FIG. 3 is a schematic diagram of a candidate motion vector according to an embodiment of this application.

The candidate MV list established in the merge mode includes a list in a spatial domain and a list in a time domain, and further includes a combination of lists for a B slice (a B-frame image). A maximum of four candidate MVs are provided in the spatial domain. The established candidate MVs are shown in (a) of FIG. 3. The list in the spatial domain is established in a sequence of A1→B1→B0→A0→B2, where B2 is an alternative. That is to say, when one or more of A1, B1, B0, or A0 do not exist, motion information of the B2 is used. A maximum of one candidate MV is provided in the time domain. The established candidate MV is shown in (b) of FIG. 3, which is obtained by scaling an MV of a co-located PU by using the following formula:

$$curMV=td*colMV/tb.$$

curMV represents an MV of the current PU, colMV represents an MV of the co-located PU, td represents a distance between the current image and the reference image, and tb represents a distance between a co-located image and the reference image. When a PU at a location D0 on the co-located block is unavailable, the PU is replaced with a co-located PU at a location D1. For the PU in the B slice, since there are two MVs, the candidate MV list also provides two motion vector predictors (MVP). A combined list for the B slice is generated by combining first four candidate MVs in the candidate MV list in pairs by the H EVC.

Similarly, an AMVP mode establishes the candidate MV list for the current PU by using MV correlation of adjacent blocks in the spatial domain and the time domain. Different from the merge mode, in the AMVP mode, an optimal predicted MV is selected from the candidate MV list, and a difference between the optimal predicted MV and an optimal MV obtained for the current coding block through motion search is coded, that is, MVD=MV−MVP is coded. The MVD is a motion vector difference. By establishing the same list, the decoder end uses serial numbers of the MVD and the MVP in the list for calculating an MV of the current decoding block. A candidate MV list in the AMVP mode also includes a list in the spatial domain and a list in the time domain, except that a length of the candidate MV list in the AMVP mode is only 2.

As described above, in the AMVP mode of the HEVC, the MVD is coded. In the HEVC, a resolution of the MVD is controlled by use_integer_mv_flag in slice_header. When a value of the flag is 0, the MVD is coded with a ¼(luminance) pixel resolution. When the value of the flag is 1, the MVD is coded with an integer (luminance) pixel resolution. In the VVC, an adaptive motion vector resolution (AMVR for short) method is used. The method allows adaptively selecting a resolution for coding a MV for each CU. In the ordinary AMVP mode, resolutions such as a ¼-pixel resolution, a ½-pixel resolution, a 1-pixel resolution, or a 4-pixel resolution may be selected. For a CU having at least one non-zero MVD component, a flag is first coded to indicate whether a quarter luminance sample MVD precision is used for the CU. If the flag is 0, the MVD of the current CU is coded with the ¼-pixel resolution. Otherwise, a second flag is coded to indicate that the ½-pixel resolution or another MVD resolution is used for the CU. Otherwise, a third flag is coded to indicate whether the 1-pixel resolution or the 4-pixel resolution is used for the CU.

II. IBC Prediction Mode

Figure 4:
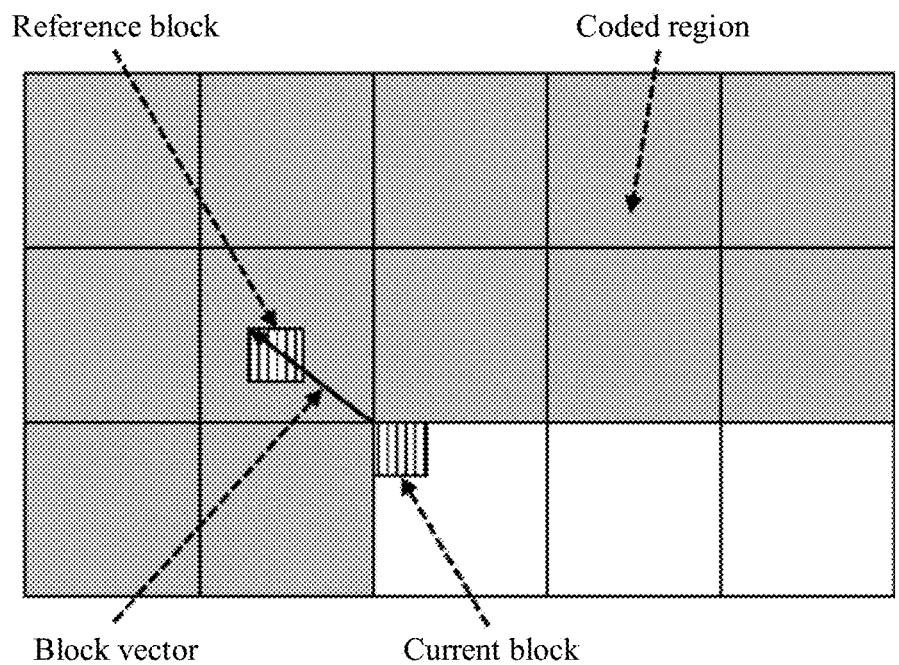
FIG. 4 is a schematic diagram of an intra block copy (IBC) mode according to an embodiment of this application.

IBC is an intra coding tool adopted in screen content coding (SCC for short) extension of the HEVC, which significantly improves coding efficiency of screen content. The AVS3 and the VVC also adopts the IBC technology to improve performance of the SCC. The IBC is to predict a pixel of a current to-be-coded block through correlation of a screen content video in the spatial domain by using a coded image pixel on a current image, which can effectively reduce bits required for coding pixels. As shown in FIG. 4, in the IBC, displacement between a current block and a reference block is referred to as a BV. The H.266/VVC adopts the BV prediction technology which is similar to the inter prediction, to further reduce bits required for coding the BV, and allows coding a block vector difference (BVD) by using the 1-pixel resolution or the 4-pixel resolution.

III. ISC Prediction Mode

Figure 5:
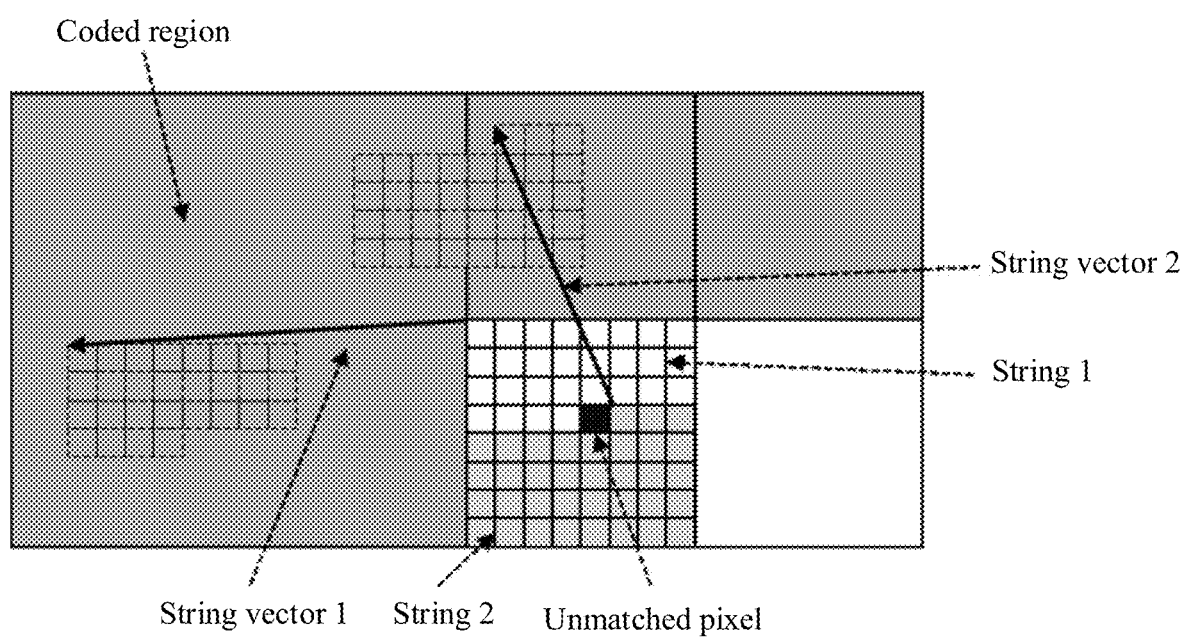
FIG. 5 is a schematic diagram of an intra string copy (ISC) mode according to an embodiment of this application.

In the ISC technology, a coding block is partitioned into a series of pixel strings or unmatched pixels in a certain scan order (such as raster scan, back/forward scan, or zigzag scan). Similar to the IBC, in this mode, for each string, a coded region of the current image is searched for a reference string having a same shape, to derive a predicted value of the current string, and a difference between a pixel value and the predicted value of the current string is coded rather than directly coding the pixel value, which can effectively save bits. FIG. 5 shows a schematic diagram of ISC. A dark gray region is a coded region, 28 white pixels represent a string 1, 35 light gray pixels represent a string 2, and one black pixel represents an unmatched pixel. Displacement between the string 1 and a reference string of the string is a string vector 1 in FIG. 4. Displacement between the string 2 and a reference string of the string is a string vector 2 in FIG. 4.

In the ISP technology, an SV and a string length corresponding to each string in the current coding block and a flag indicating whether there is a matched string are coded. The SV represents displacement between a to-be-coded string and a reference string of the to-be-coded string. The string length indicates a number of pixels included in the string. In different implementations, the string length may be coded in different manners. Examples are provided below (some of the examples may be used in combination): 1) A length of a string is directly coded in a bit stream. 2) A number of subsequent to-be-processed pixels of the string is coded in the bit stream, and the decoder end calculates the length of the current string according to a size N of the current block, a number N1 of processed pixels, and number N2 of to-be-processed pixels obtained by decoding, that is, L=N−N1−N2. 3) A flag is coded in the bit stream to indicate whether the string is the last string. If the string is the last string, the length of the current string is calculated according to the size N of the current block and the number N1 of processed pixels, that is, L=N−N1. If no corresponding reference is found from a reference region for a pixel, a pixel value of the unmatched pixel is directly coded.

In the 73rd meeting of the AVS Workgroup in June 2020, a string prediction technology was incorporated into the standard. A decoding process of the string prediction in a current solution is as follows (a bold field with an underline represents a syntax element required to be decoded, a field with a first letter being capitalized and without an underline represents a variable, and a value of the variable may be decoded from a syntax element. The following process omits details unrelated with this application):

2. Next remaining pixel number: next_remaining_pixel_in_cu[i]

A value of next_remaining_pixel_in_cu[i] represents a number of remaining pixels in the current CU that have not been decoded after the $i^{th}$ part of the current CU is decoded. A value of NextRemainingPixelInCu[i] is equal to the value of next_remaining_pixel_in_cu[i].

3. Value of the Y component of the unmatched pixel in ISC prediction: isc_unmatched_pixel_y[i]

Value of the U component of the unmatched pixel in ISC prediction: isc_unmatched_pixel_u[i]

Value of the V component of the unmatched pixel in ISC prediction: isc_unmatched_pixel_v[i]

isc_unmatched_pixel_y[i], isc_unmatched_pixel_u[i] and isc_unmatched_pixel_v[i] are all 10-bit unsigned integers respectively representing the value of the Y, Cb, and Cr components of the unmatched pixel in the $i^{th}$ part of the current CU. IscUnmatchedPixelY[i], IscUnmatchedPixelU[i], and IscUnmatchedPixelV[i] are respectively equal to the values of isc_unmatched_pixel_y[i], isc_unmatched_pixel_u[i], and isc_unmatched_pixel_v[i].

```
isc_cu_coding (x0, y0, width, height, component) { // it is
a decoding process of isc cu
    NumCodedPixel = 0           // it is a number of decoded pixels
    NumTotalPixel = width * height // it is a total number of pixels
    i = 0
    While (NumCodedPixel < NumTotalPixel) {
        StrXInCu=TravScan[Log(width)-2][Log(height)-2]
        [NumCodedPixel][0]
        StrYInCu=TravScan[Log(width)-2][Log(height)-2]
        [NumCodedPixel][1]
        isc_match_type_flag[i] // it is a flag indicating whether        ae(v)
a decoded ith part matches, a value of 0 means that the ith part is
an unmatched pixel, and 1 represents a string
        if(IscMatchTypeFlag[i] == 1) { // if the ith part is a string
            next_remaining_pixel_in_cu [i] // a next               ae(v)
remaining pixel number is decoded, and the remaining pixel number
means a number of pixels in a current CU that have not been decoded
after the ith part of the current CU is decoded
            StrLen[i] = NumTotalPixel − NumCodedPixel −
NumRemainingPixelInCu[i] − 1
        }
            decode_sv( ) // a string vector is decoded              ae(v)
            NumCodedPixel += StrLen[i]
        }
        else {        // if the ith part is an unmatched pixel
            isc_unmatched_pixel_y[i] // a Y component of the        u(10)
unmatched pixel is decoded
                if (component == 'COMPONENT_LUMACHROMA'
&& !(StrXInCu & 0x1 || StrYInCu & 0x1)) {
                    isc_unmatched_pixel_u[i] // a U component     u(10)
of the unmatched pixel is decoded
                    isc_unmatched_pixel_v[i] // a V component     u(10)
of the unmatched pixel is decoded
                }
                NumCodedPixel += 1
        }
        i ++
    } //while loop
    IscPartNum = i // there are IscPartNum parts in total
}
```

Related Semantic Description:

1. Match type flag in ISC prediction: isc_match_type_flag[i]

isc_match_type_flag[i] is a binary variable. A value of '1' indicates that the $i^{th}$ part of the current CU is a string, and a value of '0' indicates that the $i^{th}$ part of the current CU is an unmatched pixel. IscMatchTypeFlag[i] is equal to the value of isc_match_type_flag[i]. If isc_match_type_flag[i] does not exist in a bit stream, the value of IscMatchTypeFlag[i] is 0.

In the current ISC solution, the SLR is one pixel, and the CU is allowed to be partitioned into substrings having any integer pixel length (that is, an allowable string length for coding may be 1, 2, 3, . . . ). In the solution, the CU may be partitioned into pixel strings of a finer granularity, and locations of the pixel strings may not be aligned with a memory, which results in frequent memory access during pixel string reconstruction, thus affecting coding efficiency. For example, assuming that a memory unit can process data corresponding to 4 pixels in parallel, if the string length of the current string is 7, data corresponding to the pixels in the current string is allocated to two or three memory units. In this case, the decoder end is required to access the memory units twice or 3 times to complete decoding of the current string.

This application provides a video decoding method and a video coding method, to improve uniformity of pixel strings and decoding efficiency of the pixel strings. String length information of a current string is first decoded from a bit stream, a string length resolution (SLR) of the current string is determined, and then a string length of the current string is determined according to the string length information and the SLR. By using the SLR as a division and decoding basis for pixel strings, a length of a pixel string in a coding block can be limited to a multiple of the SLR, which improves uniformity of the pixel strings, so that a decoder end can perform decoding under a condition of memory alignment, thereby improving decoding efficiency of the pixel strings. For example, assuming that a memory unit can process data corresponding to 4 pixels in parallel, and the SLR is correspondingly set to 4, the length of the pixel string can only be an integer multiple of 4. Therefore, misalignment with the memory unit will not occur. Assuming that the string length of the current string is 8, the data of the pixels in the current string is stored in only two memory units, which fills two memory units. Therefore, the data is unlikely to be allocated to three memory units, so that the decoder end does not need to access one more memory unit.

Figure 6:
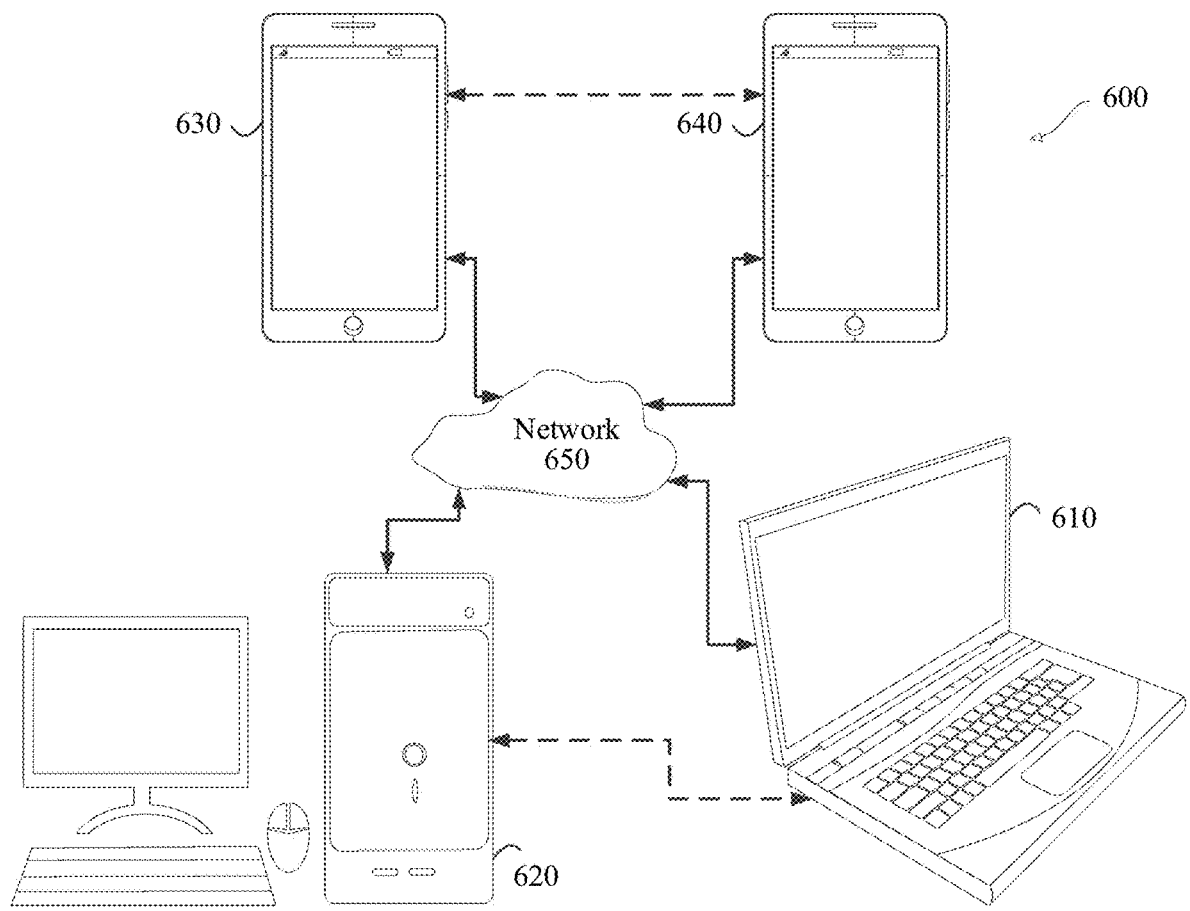
FIG. 6 is a simplified block diagram of a communication system according to an embodiment of this application.

FIG. 6 is a simplified block diagram of a communication system according to an embodiment of this application. The communication system 600 includes a plurality of devices. The devices may communicate with each other through a network 650, for example. For example, the communication system 600 includes a first device 610 and a second device 620 connected to each other through the network 650. In FIG. 6, the first device 610 and the second device 620 perform one-way data transmission. For example, the first device 610 may be configured to code video data, for example, a video picture stream captured by the first device 610, so as to transmit the coded video data to the second device 620 through the network 650. The coded video data is transmitted in a form of one or more coded video bit streams. The second device 620 may be configured to receive coded video data from the network 650, decode the coded video data to restore the video data, and display a video picture according to the restored video data. The one-way data transmission is common in application such as a media service.

In another embodiment, the communication system 600 includes a third device 630 and a fourth device 640 configured to perform bidirectional transmission of the coded video data. The bidirectional data transmission may be performed, for example, during a video conference. For the bidirectional data transmission, each of the third device 630 and the fourth device 640 may code video data (for example, a video picture stream captured by the device), and transmit the coded video data to the other of the third device 630 and the fourth device 640 through the network 650. Each of the third device 630 and the fourth device 640 may alternatively receive the coded video data transmitted by the other of the third device 630 and the fourth device 640, may decode the coded video data to restore the video data, and may display the video picture on an accessible display apparatus according to the restored video data.

In the embodiment of FIG. 6, the first device 610, the second device 620, the third device 630, and the fourth device 640 may be computer devices such as servers, personal computers, smart phones, or other suitable device. The embodiments of this application are applicable to a personal computer (PC), a mobile phone, a tablet computer, a media player, and/or a dedicated video conference device. The network 650 includes any number of networks that transmits the coded video data among the first device 610, the second device 620, the third device 630, and the fourth device 640, which includes, for example, a wired network and/or a wireless communication network. The communication network 650 may exchange data in a circuit switching channel and/or a packet switching channel. The network may include a telecommunication network, a local area network, a wide area network, and/or the Internet. For the purpose of this application, unless explained below, an architecture and a topology of the network 650 may be inessential to the operation disclosed in this application.

Figure 7:
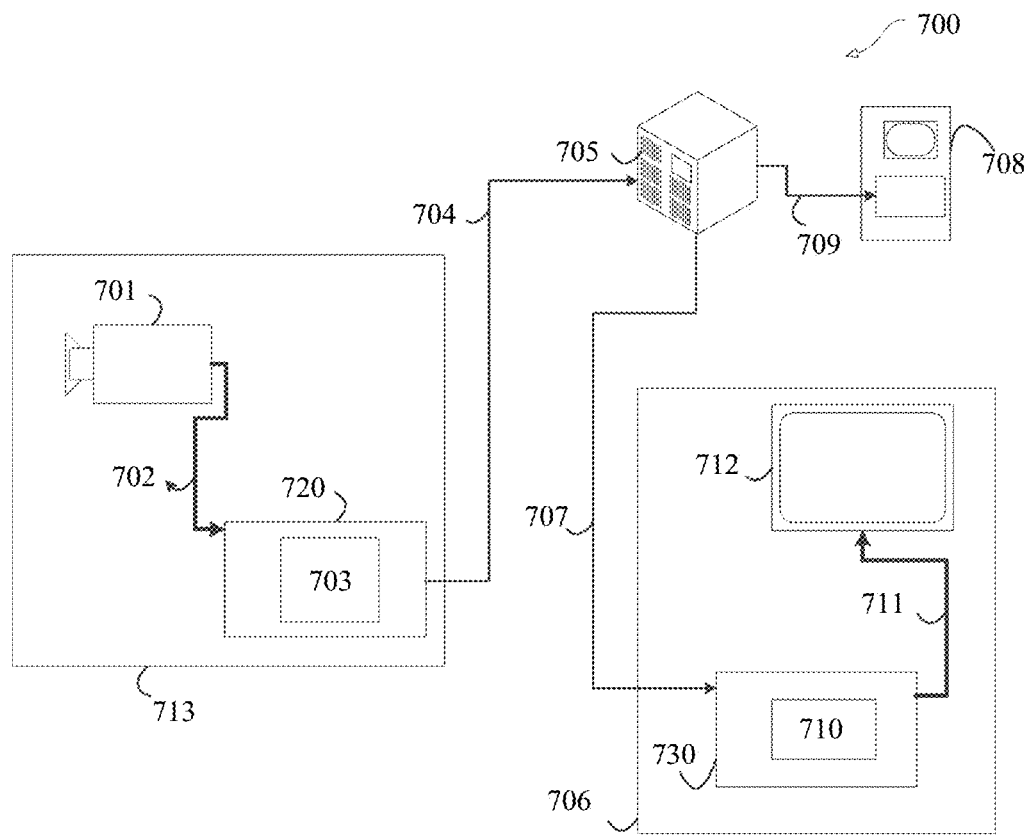
FIG. 7 is an example schematic diagram of placement of a video coder and a video decoder in a streaming transmission environment according to this application.

FIG. 7 shows placement of a video coder and a video decoder in a streaming transmission environment. The subject disclosed in this application is applicable to other applications supporting videos, including, for example, videoconferencing, digital television (TV), and storage of compressed videos on digital media including a compact disc (CD), a digital versatile disc (DVD), a memory stick, and the like.

A streaming transmission system may include a capture subsystem 713. The capture subsystem 713 may include a video source 701 such as a digital camera. The video source 701 creates an uncompressed video picture stream 702. In some embodiments, the video picture stream 702 includes samples captured by the digital camera. Compared with coded video data 704 (or a coded video bit stream), the video picture stream 702 is depicted by using a thick line to emphasize a high data volume of the video picture stream. The video picture stream 702 may be processed by an electronic device 720. The electronic device 720 includes a video coding apparatus 703 coupled to the video source 701. The video coder 703 may include hardware, software, or a combination of hardware and software to realize or implement various aspects of the disclosed subject described in more detail below. Compared with the video picture stream 702, the coded video data 704 (or a coded video bit stream 704) is depicted by using a thin line to emphasize a low data volume of the coded video data 704 (or a coded video bit stream 704), which may be stored on a streaming transmission server 705 for future use. One or more streaming transmission client subsystems, such as a client subsystem 706 and a client subsystem 708 in FIG. 7, may access streaming transmission server 705 to retrieve a copy 707 and a copy 709 of the coded video data 704. The client subsystem 706 may include, for example, a video decoder 710 in an electronic device 730. The video decoder 710 decodes the received copy 707 of the coded video data, and generates an output video picture stream 711 that can be presented on a display 712 (for example, a display screen) or another display apparatus (not shown). In some streaming transmission systems, the coded video data 704, the copy 707 of the video data, and the copy 709 of the video data (for example, the video bit stream) may be coded according to some video coding/compression standards.

The electronic device 720 and the electronic device 730 may further include other assemblies (not shown). For example, the electronic device 720 may further include a video decoder (not shown), and the electronic device 730 may further include a video coder (not shown). The video decoder is configured to decode the received coded video data. The video coder is configured to code the video data.

The technical solutions provided in the embodiments of this application are applicable to the H.266/VVC standard, the H.265/HEVC standard, the AVS (such as AVS3), and other video and decoding standards, including next-generation standards.

Steps in the video decoding method provided in the embodiments of this application may be performed by a decoder-end device. Steps in the video coding method provided in the embodiments of this application may be performed by a coder-end device. During video decoding in an ISC mode, a string length of a current string may be obtained by decoding by using the decoding solution provided in the embodiments of this application. During video coding in the ISC mode, the string length of the current string may be coded by using the coding solution provided in the embodiments of this application. The decoder-end device and the coder-end device each may be a computer device. The computer device is an electronic device having capabilities of data computation, processing, and storage, such as a PC, a mobile phone, a tablet computer, a media player, a dedicated video conference device, or a server.

In addition, the method provided in this application may be used alone or in combination with other methods in any order. The coder and the decoder based on the method provided in this application may be implemented by one or more processors or one or more integrated circuits. The technical solutions of this application are described by using several embodiments below.

Figure 8:
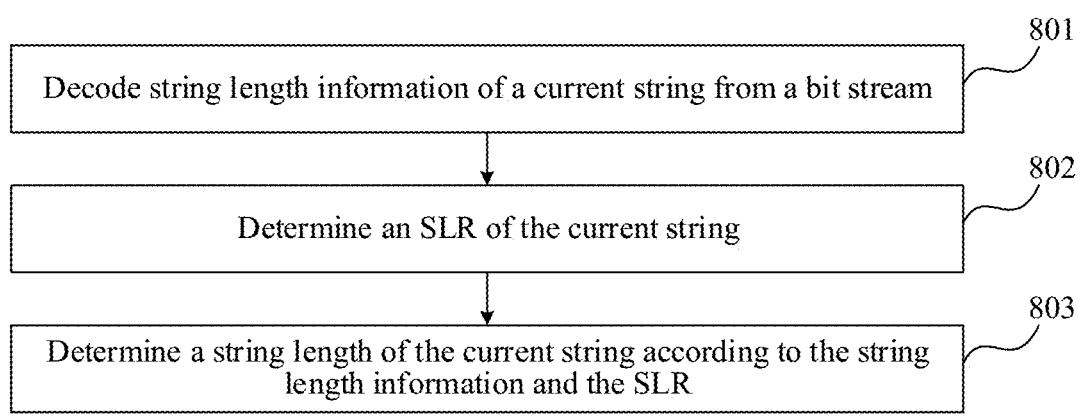
FIG. 8 is a flowchart of a video decoding method according to an embodiment of this application.

FIG. 8 is a flowchart of a video decoding method according to an embodiment of this application. The method is applicable to a decoder-end device. The method may include the following steps (801 to 803):

Step 801: Decode string length information of a current string from a bit stream.

The bit stream is a data stream generated after a video is coded, which may be represented by a series of binary data such as 0 and 1. In some standards, the bit stream is a binary data stream formed by an encoded image.

The current string is a currently decoded pixel string. The pixel string is a pixel sequence composed of a specific number of pixels. In some embodiments, the pixel string is an ordered sequence composed of data having a finite number of binary bits. In an ISC mode, one CU may be partitioned into a plurality of pixel strings. During video decoding, to restore a pixel value of each pixel in each pixel string, a string length of the pixel string is determined first.

The string length information is information in the bit stream related to the string length of the pixel string, and is used for determining the string length of the pixel string. In some embodiments, the string length information of the current string includes information related to the string length of the current string, and is used for determining the string length of the current string.

Step 802: Determine an SLR of the current string.

The SLR is a minimum string length for partitioning the CU into pixel strings, that is, a minimum allowable string length. For example, an SLR of 4 indicates a minimum string length 4 of a pixel string.

In some embodiments, the SLR may be represented by N, N being a positive integer. In some embodiments, N is a positive integer greater than 1. When the SLR is N, the string length of the pixel string is an integer multiple of N. For example, the string length of the pixel string may be N, 2N, 3N, 4N, 5N, or the like. For example, when the SLR is 4, the string length of the pixel string may be 4, 8, 12, 16, 20, or the like.

In the embodiments of this application, the following example manners of determining the SLR of the current string are provided.

Manner I: A first reference value is determined as the SLR of the current string. The first reference value is a preset value of the SLR. For example, the first reference value may be predefined in a protocol. During decoding of the current string, the decoder end determines the first reference value as the SLR of the current string, without a need to acquire the SLR of the current string from the bit stream.

Manner II: The SLR of the current string is decoded from a sequence header of an image sequence to which the current string belongs. In some standards, the image sequence is also referred to as a video sequence, which is a highest-level syntax structure of a coded bit stream, and includes one or more consecutive coded images. In some embodiments, the image sequence starts with a first sequence header, and a sequence ending code or a video editing code indicates an end of the image sequence. A sequence header between the first sequence header of the image sequence and a first sequence ending code or the video editing code is a repeated sequence header. In some embodiments, each sequence header is followed by one or more coded images, and each image is preceded by an image header. In some embodiments, the coded images are arranged in a bit stream order in the bit stream, and the bit stream order is the same as a decoding order. The decoding order may not be the same as a display order. The sequence header of the image sequence includes related information for decoding the image sequence. For example, the sequence header of the image sequence may be a special reserved field that is attached to a front of a corresponding data sequence of the image sequence in the bit stream and defines a bit length. In this example, the sequence header of the image sequence further includes the SLR. In some embodiments, SLRs of strings included in the image sequence to which the current string belongs are the same, all of which are the SLR decoded from the sequence header of the image sequence. In an example, the decoder end decodes a piece of indication information (such as an index, a syntax element, or other indication information) from the sequence header of an image sequence. The indication information indicates the SLRs of all of the strings in the image sequence.

Manner III: The SLR of the current string is decoded from an image header of an image to which the current string belongs. The image is a single image frame in a video. In some standards, an image may be a frame or a field. In some embodiments, the image is a coded image, and the coded image is a coded representation of the image. The image header of the image includes related information for decoding the image. For example, the image header of the image is a special reserved field that is attached to a front of a corresponding data sequence of the image in the bit stream and defines a bit length. In this example, the image header of the image further includes the SLR. In some embodiments, SLRs of strings included in the image to which the current string belongs are the same, all of which are the SLR decoded from the image header of the image. In an example, the decoder end decodes a piece of indication information (such as an index, a syntax element, or other indication information) from the image header of the image. The indication information indicates the SLRs of all of the strings in the image.

Manner IV: The SLR of the current string is decoded from a patch header of a patch to which the current string belongs. The patch is a plurality of adjacent LCUs arranged in a raster scan order. Raster scan means mapping a two-dimensional rectangular raster to a one-dimensional raster. An entry to scan the one-dimensional raster is a first row of the two-dimensional raster. Then a second row, a third row, and so on are scanned. The rows in the raster are scanned from left to right. The patch header of the patch includes related information for decoding the image. For example, the patch header of the patch is a special reserved field that is attached to a front of a corresponding data sequence of the patch in the bit stream and that defines a bit length. In this example, the patch header of the patch further includes the SLR. In some embodiments, SLRs of strings included in the patch to which the current string belongs are the same, all of which are the SLR decoded from the patch header of the patch. In an example, the decoder end decodes a piece of indication information (such as an index, a syntax element, or other indication information) from the patch header of the patch. The indication information indicates the SLRs of all of the strings in the patch.

Manner V: The SLR of the current string is decoded from coding information of an LCU to which the current string belongs. In some standards, the LCU includes an L*L luminance sample block and a corresponding chroma sample block, which are obtained by image partitioning. The coding information of the LCU includes related information for decoding the LCU. For example, the coding information of the LCU is a special reserved field that is attached to a front of a corresponding data sequence of the LCU in the bit stream and defines a bit length. One LCU may include a plurality of CUs. In this example, the coding information of the LCU further includes the SLR. In some embodiments, SLRs of strings included in the LCU to which the current string belongs are the same, all of which are the SLR decoded from the coding information of the LCU. In an example, the decoder end decodes a piece of indication information (such as an index, a syntax element, or other indication information) from the coding information of the LCU. The indication information indicates the SLRs of all of the strings in the LCU.

Manner VI: the SLR of the current string is decoded from coding information of a CU to which the current string belongs. The coding information of the CU includes related information for decoding the CU. For example, the coding information of the CU is a special reserved field that is attached to a front of a corresponding data sequence of the CU in the bit stream and defines a bit length. In this example, the coding information of the CU further includes the SLR. In some embodiments, SLRs of strings included in the CU to which the current string belongs are the same, all of which are the SLR decoded from the coding information of the CU. In an example, the decoder end decodes a piece of indication information (such as an index, a syntax element, or other indication information) from the coding information of the CU. The indication information indicates the SLRs of all of the strings in the CU.

Manner VII: The SLR of the current string is decoded from coding information of the current string. The coding information of the current string includes related information for decoding the current string. For example, the coding information of the current string is a special reserved field that is attached to a front of a corresponding data sequence of the current string in the bit stream and defines a bit length. In this example, the coding information of the current string further includes the SLR of the current string. In an example, the decoder end decodes a piece of indication information (such as an index, a syntax element, or other indication information) from the coding information of the current string. The indication information indicates the SLR of the current string. In this way, the SLRs of the different strings can be flexibly indicated in respective coding information.

Manner VIII: The SLR of the current string is determined according to a size of a decoding block to which the current string belongs. In some standards, the decoding block is an M*N sample matrix (including M columns and N rows) or a transform coefficient matrix. In some embodiments, the decoding block to which the current string belongs may be the CU to which the current string belongs. In some embodiments, the size of the decoding block to which the current string belongs is acquired. The size of the decoding block to which the current string belongs includes a height or a width of the decoding block to which the current string belongs. In an example, for a block having a size of 4*4, the SLR N is equal to 1, for a block having a size of 16*16, the SLR N is equal to 2, and for a block having an area (width*height) greater than 128, the SLR N is equal to 2.

Manner IX: The SLR of the current string is determined according to a color component and a chroma format corresponding to the current string. The chroma format is a color coding format used for the pixel. In some standards, the chroma format (chroma_format) is a 2-bit unsigned integer, which specifies a format of a chroma component. The color component is a chroma component of the pixel in the chroma format. In some embodiments, a pixel in a current video is in an RGB format or a YUV format. In an example, in a video in YUV 4:2:0 format, if it is determined that an SLR N of a luminance component is equal to 4, an SLR N of the chroma component is equal to 2.

Manner X: A second reference value is determined as the SLR of the current string if a number of decoded strings in the CU to which current string belongs is greater than or equal to a first threshold. The first threshold is a reference value, which is a basis for determining the SLR of the current string in this manner. In some embodiments, the first threshold may be determined according to a specification of the CU, and CUs of different specifications may correspond to a same first threshold or different first thresholds. The second reference value is a preset value of the SLR, which is applicable when the number of decoded strings in the CU to which the current string belongs is greater than or equal to the first threshold. The second reference value may be predetermined in a protocol. In an example, it is assumed that the number of decoded strings in the current CU is N1. If N1 is greater than or equal to the first threshold, the SLR of the current string may be determined as the second reference value of 4. In addition, if the number of decoded strings in the CU to which the current string belongs is less than the first threshold, the SLR of the current string may be determined by using other methods described in the embodiments of this application, or another reference value different from the second reference value may be determined as the SLR of the current string.

Manner XI: A third reference value is determined as the SLR of the current string if a number of decoded and unmatched pixels in the CU to which the current string belongs is greater than or equal to a second threshold. The unmatched pixel is a pixel that is not successfully matched, that is, a pixel that does not match a pixel at a corresponding location in a reference string of the current string. The second threshold is a reference value, which is a basis for determining the SLR of the current string in this manner. In some embodiments, the second threshold may be determined based on the number of decoded and unmatched pixels in the CU to which the current string belongs. The second threshold, based on the number of decoded and unmatched pixels, may be the same or different for different CUs. The third reference value is a preset value of the SLR, which is applicable when the number of decoded and unmatched pixels in the CU to which the current string belongs is greater than or equal to the second threshold. The third reference value may be predetermined in a protocol. In an example, it is assumed that the number of decoded and unmatched pixels in the current CU is N2. If N2 is greater than or equal to the second threshold, it may be determined that the SLR of the current string is the third reference value. In addition, if the number of decoded and unmatched pixels in the CU to which the current string belongs is less than the second threshold, the SLR of the current string may be determined by using other methods described in the embodiments of this application, or another reference value different from the third reference value may be determined as the SLR of the current string.

Manner XII: A fourth reference value is determined as the SLR of the current string when a number of undecoded pixels in the CU to which the current string belongs is less than or equal to a third threshold. The third threshold is a reference value, which is a basis for determining the SLR of the current string in this manner. In some embodiments, the third threshold may be determined based on the number of decoded and unmatched pixels in the CU to which the current string belongs. The third threshold, based on the number of decoded and unmatched pixels, may be the same or different for different CUs. The fourth reference value is a preset value of the SLR, which is applicable when the number of undecoded pixels in the CU to which the current string belongs is less than or equal to the third threshold. The fourth reference value may be predetermined in a protocol. In addition, if the number of undecoded pixels in the CU to which the current string belongs is greater than the third threshold, the SLR of the current string may be determined by using other methods described in the embodiments of this application, or another reference value different from the fourth reference value may be determined as the SLR of the current string.

Step 803: Determine a string length of the current string according to the string length information and the SLR. The string length of the current string is a number of pixels included in the current string.

In an example embodiment, the string length information includes a string length code of the current string. The decoder end multiplies the string length code of the current string by the SLR to obtain the string length of the current string. In an example, the string length code of the current string is decoded from the bit stream as L0, and the decoder end multiplies the string length code L0 of the current string by the SLR N to obtain the string length L of the current string, that is, L=L0*N.

In some embodiments, the decoder end acquires the string length code of the current string from the bit stream. The string length code is data in the bit stream representing the string length.

In an example, the SLR is 4, and the string length is an integer multiple of 4. The coder end shifts the string length rightward by two bits and then performs coding to generate a string length code. The decoder end shifts the string length code obtained from the bit stream leftward by two bits to restore an actual string length value. For example, the string length of the current string is a minimum string length of 4 (that is, a binary number of 100). The coder end shifts the string length of 100 (which is a binary number) rightward by two bits, and then performs coding to generate a string length code of 1 (which is a binary number) of the current string. The decoder end shifts the string length code of 1 obtained from the bit stream leftward by two bits to restore the uncoded string length value of 100 (that is, 4). In another example, the string length of the current string is 8 (that is, a binary number of 1000). The coder end shifts the string length of 1000 (which is a binary number) rightward by two bits, and then performs coding to generate a string length code of 10 (which is a binary number) of the current string. The decoder end shifts the string length code of 10 obtained from the bit stream leftward by two bits to restore the uncoded string length value of 1000 (that is, 8).

In an example embodiment, the string length information includes a code of a number of remaining pixels in a decoding block to which the current string belongs after the current string is decoded.

The code of the number of remaining pixels in the decoding block to which the current string belongs after the current string is decoded is a coded representation of a number of remaining undecoded pixels in the decoding block to which the current string belongs after the current string is decoded in the bit stream. In some embodiments, the code of the number of remaining pixels is stored in a sequence header of a data sequence in the bit stream. The data sequence may be a data sequence in the bit stream corresponding to the image, or may be a data sequence in the bit stream corresponding to the current string, or may be a data sequence corresponding to the coding block in the bit stream. In an example, the SLR of each string in the decoding block to which the current string belongs is 4. After the decoder end decodes the current string, assuming that the number of remaining undecoded pixels in the decoding block to which the current string belongs is 4, that is, a binary number of 100, a corresponding coded representation (that is, the code of the number of remaining pixels) is 1. In some embodiments, the code of the number of remaining pixels is coded as M0.

In some embodiments, step 803 may include the following substeps (8031-8034):

Step 8031: Acquire a total number of pixels of a decoding block to which the current string belongs.

In some embodiments, the total number of pixels of the decoding block is obtained by multiplying a height by a width of the decoding block. In some embodiments, the total number of pixels of the decoding block to which the current string belongs is denoted as M.

Step 8032: Acquire a number of decoded pixels of the decoding block to which the current string belongs.

In some embodiments, the number of decoded pixels may be obtained by accumulating lengths of decoded pixel strings by using the decoder end. In some embodiments, the number of decoded pixels of the decoding block to which the current string belongs is denoted as M2.

Step 8033: Multiply a code of the number of remaining pixels by the SLR to obtain the number of remaining pixels in the decoding block to which the current string belongs after the current string is decoded.

In some embodiments, the code M0 of the number of remaining pixels is multiplied by the SLR N to obtain the number M1 of remaining pixels in the decoding block to which the current string belongs after the current string is decoded, that is, M1=M0*N.

Step 8034: Determine the string length of the current string based on the total number of pixels, the number of decoded pixels, and the number of remaining pixels after the current string is decoded.

In some embodiments, the number of decoded pixels and the number of remaining pixels are subtracted from the total number of pixels, to obtain the string length L of the current string, that is, L=M−M1−M2.

In an example embodiment, the string length information includes a remaining string flag, the remaining string flag being used for indicating whether the current string is the last string in a decoding block to which the current string belongs.

In some embodiments, the remaining string flag is a binary variable, which is represented by a one-bit binary number. In some embodiments, if the remaining string flag is 0, the current string is the last string in the decoding block to which the current string belongs. If the remaining string flag is 1, the current string is not the last string in the decoding block to which the current string belongs.

In some embodiments, step 803 may include the following substeps (803a-803d):

Step 803a: Acquire a total number of pixels of a decoding block to which the current string belongs.

Step 803b: Acquire a number of decoded pixels of the decoding block to which the current string belongs.

Step 803c: Subtract the number of decoded pixels from the total number of pixels to obtain the string length of the current string if the current string is the last string.

In some embodiments, the number M2 of decoded pixels is subtracted from the total number M of pixels to obtain the string length L of the current string, that is, L=M−M2.

Step 803d: Acquire a code of a number of remaining pixels in the decoding block to which the current string belongs after the current string is decoded is acquired when the current string is not the last string; multiply the code of the number of remaining pixels by the SLR to obtain the number of remaining pixels in the decoding block to which the current string belongs after the current string is decoded; and determine the string length of the current string based on the total number of pixels, the number of decoded pixels, and the number of remaining pixels after the current string is decoded.

The string length information further includes the code of the number of remaining pixels in the decoding block to which the current string belongs after the current string is decoded; or the string length information further includes the code of the number of remaining pixels in the decoding block to which the current string belongs after the current string is decoded minus a first value, the first value being 1, for example.

In some embodiments, a code obtained by subtracting the first value, for example, 1 from the code of the number of remaining pixels is denoted as M0. In some embodiments, the code M0 obtained by subtracting the first value, for example, 1 from the code of the number of remaining pixels plus the first value, for example, 1 is multiplied by the SLR to obtain the number M1 of remaining pixels in the decoding block to which the current string belongs after the current string is decoded, that is, M1=(M0+1)*N. In some embodiments, the number of decoded pixels and the number of remaining pixels are subtracted from the total number of pixels, to obtain the string length L of the current string, that is, L=M−M1−M2.

In conclusion, in the technical solution provided in this embodiment of this application, the string length information of the current string is first decoded from the bit stream, the SLR of the current string is determined, and then the string length of the current string is determined according to the string length information and the SLR. By using the SLR as a division and decoding basis for pixel strings, a length of a pixel string in a coding block can be limited to a multiple of the SLR, which improves uniformity of the pixel strings, so that a decoder end can perform decoding under a condition of memory alignment, thereby improving decoding efficiency of the pixel strings.

In addition, by further setting the limit range of SLR, the decoding efficiency of the pixel strings is further improved. Moreover, the pre-coded data related to the string length is decoded according to the SLR, so that an amount of decoded data is effectively reduced, thereby improving the decoding efficiency.

Figure 9:
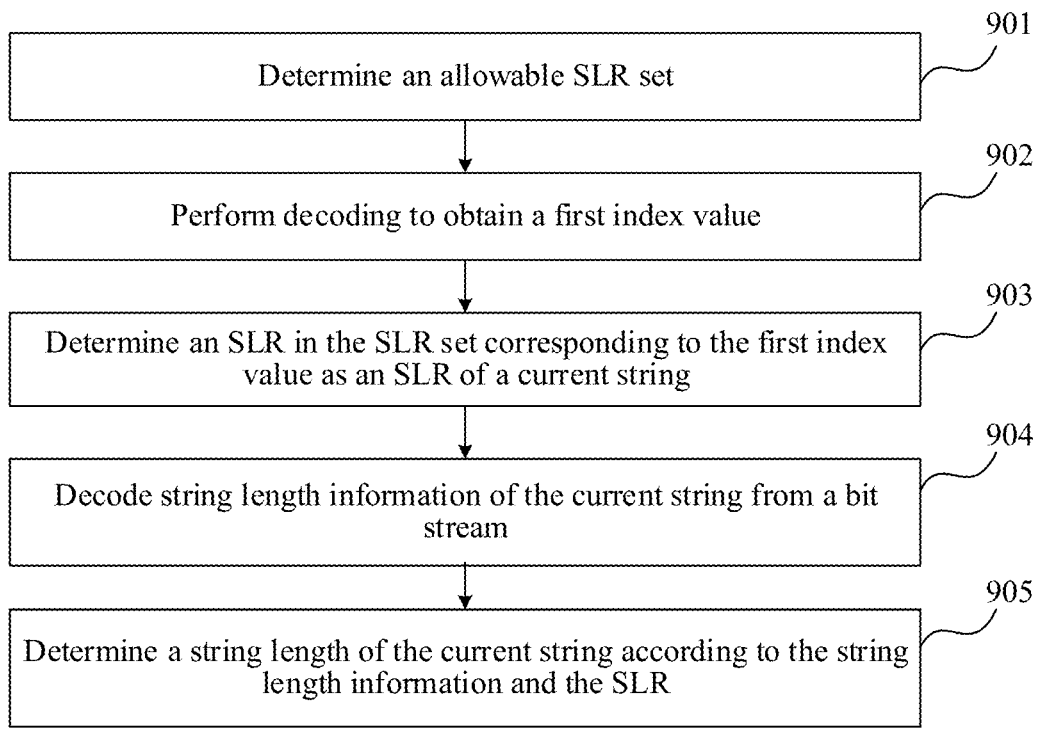
FIG. 9 is a flowchart of a video decoding method according to an embodiment of this application.

FIG. 9 is a flowchart of a video decoding method according to another embodiment of this application. The method is applicable to a decoder-end device. The method may include the following steps (901 to 905):

Step 901: Determine an allowable SLR set.

The SLR set is a set of SLRs. In some embodiments, the allowable SLR set is a set of allowable SLRs, and is used for indicating an SLR range allowed for a coder/decoder end. SLRs outside the allowable SLR set cannot be used. In some embodiments, the allowable SLR set includes one or more SLRs.

In some embodiments, the allowable SLR set includes at least one set of correspondences between index values and SLRs. In some embodiments, an index value corresponding to an SLR is a unique identifier of the SLR, and different SLRs have different index values. In some embodiments, a one-to-one correspondence exists between index values and the SLRs in the SLR set.

In some embodiments, the SLR included in the SLR set includes at least one of the following: one or more reference values, a width of a current CU, or a height of the current CU.

In some embodiments, the SLR is one or more reference values. In some embodiments, the reference value includes at least one of the following: 1. an arbitrary constant; or 2. half of a product of the width of the current CU and the height of the current CU. In some embodiments, the arbitrary constant is a positive integer such as 1, 2, 4, ..., which may be simply represented by 2k, k being an integer greater than or equal to 0. In some embodiments, assuming that the width of the current CU is W and the height is H, the SLR includes 1, 2, 4, ..., W*H/2.

In some embodiments, the SLR is the width of the current CU. In some embodiments, when the current CU is scanned along a horizontal direction, an SLR included in the SLR set is the width of the current CU.

In some embodiments, the SLR is the height of the current CU. In some embodiments, when the current CU is scanned along a vertical direction, an SLR included in the SLR set includes the height of the current CU.

Step 902: Perform decoding to obtain a first index value.

In some embodiments, a sequence header (for example, the sequence header, the image header, or the slice header describe above) of a data sequence in the bit stream corresponding to a current string is decoded to obtain the first index value. The first index value is an index value corresponding to the SLR of the current string.

Step 903: Determine an SLR in the SLR set corresponding to the first index value as an SLR of a current string.

In some embodiments, the SLR in the SLR set corresponding to the first index value is determined based on the correspondences between the index values and the SLRs, and is used as the SLR of the current string.

Step 904: Decode string length information of the current string from a bit stream.

Step 905: Determine a string length of the current string according to the string length information and the SLR.

For description of step 905, reference may be made to the description of step 803 in the above embodiment of FIG. 8.

In conclusion, in the technical solution provided in this embodiment of this application, the allowable SLR set is determined by properly selecting the SLRs, then the corresponding SLR is selected according to the index value obtained from the bit stream, and the pixel string is decoded. In this way, an amount of decoded data is further reduced, and times a device accesses a memory during the decoding are reduced, thereby improving decoding efficiency.

Figure 10:
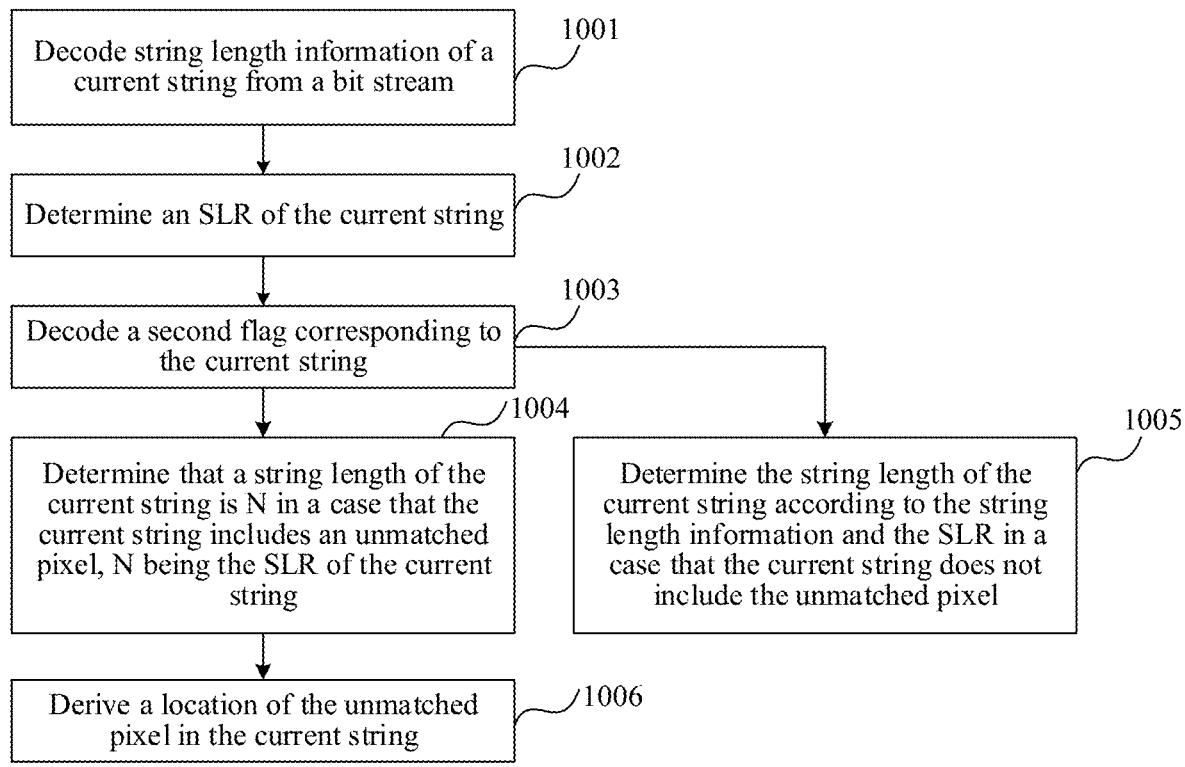
FIG. 10 is a flowchart of a video decoding method according to an embodiment of this application.

FIG. 10 is a flowchart of a video decoding method according to another embodiment of this application. The method is applicable to a decoder-end device. The method may include the following steps (1001 to 1006):

Step 1001: Decode string length information of a current string from a bit stream.

Step 1002: Determine an SLR of the current string.

Step 1003: Decode a string matching flag corresponding to the current string, the string matching flag being used for indicating whether the current string includes an unmatched pixel.

The string matching flag is a binary variable, which is represented by a one-bit binary number. In some embodiments, if the string matching flag is 0, the current string does not include the unmatched pixel. If the string matching flag is 1, the current string includes the unmatched pixel.

Step 1004: Determine that a string length of the current string is N when the current string includes the unmatched pixel, N being the SLR of the current string.

In some embodiments, after step 1004 is performed, the method further includes step 1006 of deriving a location of the unmatched pixel in the current string.

Step 1005: Determine the string length of the current string according to the string length information and the SLR of the current string when the current string does not include the unmatched pixel.

In an example embodiment, when the current string includes the unmatched pixel, step 1006 may be implemented as follows:

Manner a: An unmatched pixel flag included in the current string corresponding to each pixel is decoded.

The unmatched pixel flag is used for indicating whether the pixel is an unmatched pixel. The unmatched pixel flag is a binary variable, which is represented by a one-bit binary number. In some embodiments, if the unmatched pixel flag is 0, it indicates that the pixel is not an unmatched pixel. If the unmatched pixel flag is 1, it indicates that the pixel is an unmatched pixel. In some embodiments, the unmatched pixel flag included in the current string corresponding to each pixel is decoded from the bit stream. In some embodiments, when the string length of the current string is N, if the unmatched pixel flags in the current string corresponding to the first N−1 pixels all indicate that the corresponding pixels are matched pixels, it is determined that the last pixel is an unmatched pixel, that is, an $N^{th}$ pixel is an unmatched pixel. The unmatched pixel flag corresponding to the $N^{th}$ pixel may be coded or not coded.

Manner a: Decoding is performed to obtain a number of unmatched pixels included in the current string and an unmatched pixel location flag. A location of each unmatched pixel included in the current string is determined according to the unmatched pixel location flag.

In some embodiments, a code of the number of unmatched pixels included in the current string is decoded from the string length information, and the number of unmatched pixels included in the current string is determined according to the code of the number of unmatched pixels included in the current string. In some embodiments, the number of unmatched pixels included in the current string is coded and stored in the sequence header of the data sequence in the bit stream. The data sequence may be a data sequence in the bit stream corresponding to the image, or may be a data sequence in the bit stream corresponding to the current string, or may be a data sequence in the bit stream corresponding to a coding block in the bit stream.

In some embodiments, if the decoded number of unmatched pixels included in the current string is N, it is determined that all pixels in the current string are unmatched pixels, N being the SLR. The location of each unmatched pixel included in the current string is not required to be decoded.

The unmatched pixel location flag is used for indicating the locations of the unmatched pixels in the current string. One or more unmatched pixel location flags may be provided.

In an example, a number of unmatched pixel location flags corresponding to the current string is the same as the number of unmatched pixels in the current string. An unmatched pixel location flag corresponding to an unmatched pixel in the current string is used for indicating a location of the unmatched pixel in the current string.

In an example, numbers of bits of the unmatched pixel location flags corresponding to all of the unmatched pixels are the same. In some embodiments, the number of bits for the unmatched pixel location flag may be determined based on the string length of the current string. For example, if the string length of the current string is 4, the unmatched pixel location flag may be a 2-bit binary number. For example, 00 represents the first location in the current string, 01 represents the second location in the current string, 10 represents the third location in the current string, and 11 represents the fourth location in the current string. It is assumed that the number of unmatched pixels in the current string is 2, and the unmatched pixels are respectively at the first location and the third location of the current string. Therefore, the unmatched pixel location flag corresponding to the first unmatched pixel may be 00 (representing the first location in the current string), and the unmatched pixel location flag corresponding to the second unmatched pixel may be 10 (representing the third location in the current string).

In another example, numbers of bits of the unmatched pixel location flags corresponding to all of the unmatched pixels are the same. In some embodiments, after the number of unmatched pixels included in the current string is determined, the locations of the unmatched pixels in the current string are determined one by one. It is still assumed that the string length of the current string is 4, and the number of unmatched pixels in the current string is 2. First, a 2-bit binary number is used to determine the location of the first unmatched pixel (for example, the unmatched pixel location flag corresponding to the first unmatched pixel is 01, which indicates that the first unmatched pixel is at the second location in the current string), and then a number of bits of a binary number for the unmatched pixel location flag corresponding to the next unmatched pixel is determined according to a number of remaining unmatched pixels (that is, a number of unmatched pixels in the current string to which the unmatched pixel location flag has not been assigned). For example, if the first unmatched pixel is at the second location in the string, a 1-bit binary number is used to determine the location of the second unmatched pixel in the remaining pixels in the string. For example, the unmatched pixel location flag corresponding to the second unmatched pixel is 0, which indicates that the second unmatched pixel is at the third location in the current string. Alternatively, the unmatched pixel location flag corresponding to the second unmatched pixel is 1, which indicates that the second unmatched pixel is at the fourth location in the current string.

Manner c: It is determined that each pixel included in the current string is an unmatched pixel.

In some embodiments, it is determined that each pixel included in current string is an unmatched pixel if the string length of the current string is a minimum string length.

In conclusion, the technical solution provided in this embodiment of this application, it is determined whether the pixel string includes the unmatched pixel, and the solution for determining the location of the unmatched pixel in the string when the pixel string includes the unmatched pixel, which ensures accurate determination of a type of each pixel, thereby facilitating accurate decoding.

Figure 11:
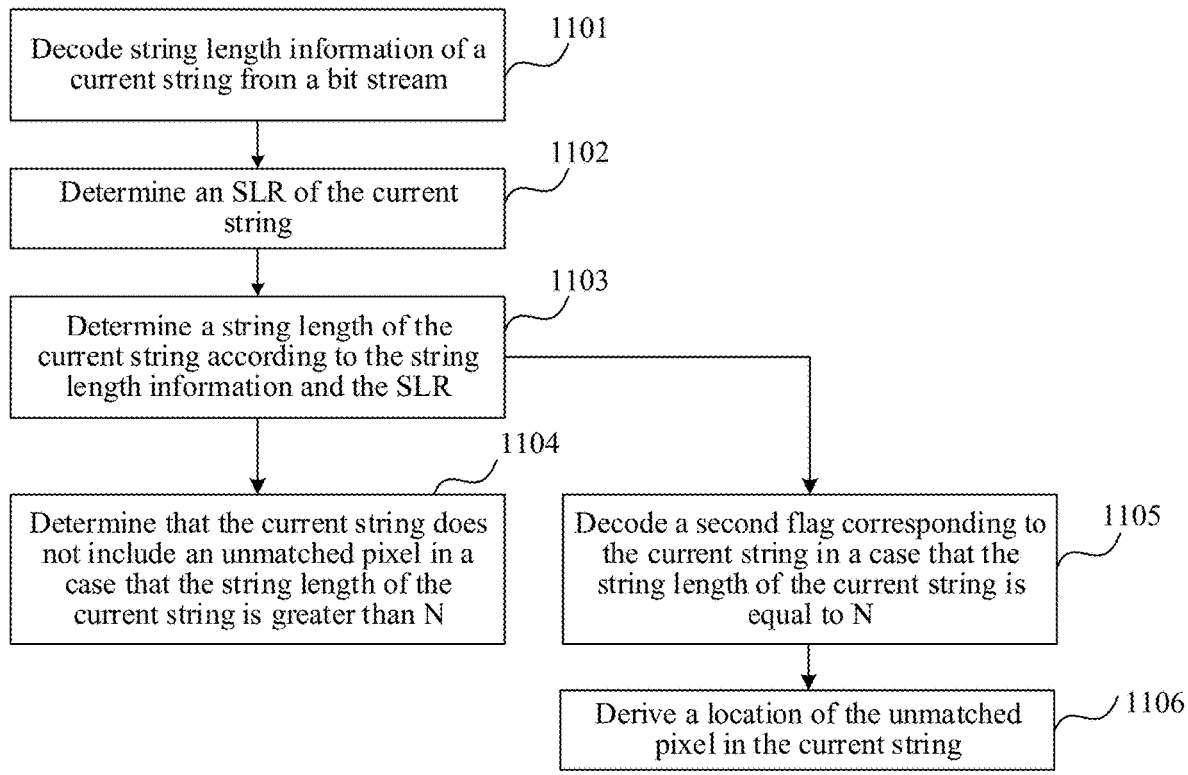
FIG. 11 is a flowchart of a video decoding method according to an embodiment of this application.

FIG. 11 is a flowchart of a video decoding method according to an embodiment of this application. The method is applicable to a decoder-end device. The method may include the following steps (1101 to 1106):

Step 1101: Decode string length information of a current string from a bit stream.

Step 1102: Determine an SLR of the current string.

Step 1103: Determine a string length of the current string according to the string length information and the SLR.

Step 1104: Determine that the current string does not include an unmatched pixel when the string length of the current string is greater than N.

In some embodiments, N is the SLR of the current string, and N is a minimum string length when the SLR is N.

Step 1105: Decode a string matching flag corresponding to the current string when the string length of the current string is equal to N.

In some embodiments, the string matching flag is used for indicating whether the current string includes an unmatched pixel. In some embodiments, if the string length of the current string is equal to the minimum string length, the string matching flag corresponding to the current string is decoded. In some embodiments, the string matching flag corresponding to the current string may be decoded according to the method provided in the above embodiment.

In an example embodiment, after step 1105, the method further includes step 1106 of deriving the location of the unmatched pixel in the current string if the current string includes the unmatched pixel.

In some embodiments, deriving the location of the unmatched pixel in the current string may be performed as previously described.

In conclusion, in the technical solution provided in this embodiment of this application, based on the SLR, it is determined whether the pixel string includes the unmatched pixel according to the string length of the pixel string, and the location of the unmatched pixels is determined, which facilitates decoding of the pixel string, thereby reducing a data space occupied by the unmatched pixel flag (that is, the string matching flag), and improving decoding efficiency.

In an example embodiment, the above video decoding method further includes the following steps to determine a pixel value of each pixel in the current string.

In a solution without residual coding on an ISC block, a predicted value is a reconstructed value.

A string vector of the current string is obtained by decoding when the current string does not include the unmatched pixel. A reference string of the current string is determined based on the string vector of the current string. A pixel value of the reference string of the current string is determined as a predicted value of the current string.

A string vector of the current string is obtained by decoding when the current string includes the unmatched pixel. A reference string of the current string is determined based on the string vector of the current string. A pixel value of the unmatched pixel in the current string is decoded from the bit stream. A pixel value in the reference string corresponding to a matched pixel in the current string is determined as a predicted value of the matched pixel.

The above string vector is a displacement vector used for determining the reference string of the current string in an ISC prediction mode. In some embodiments, the current string includes a plurality of candidate string vectors. In some embodiments, a plurality of candidate string vectors of the current string may constitute a candidate string vector set (list) of the current string. The candidate string vector set of the current string includes at least one set of correspondences between index values and string vectors.

Exemplarily, assuming that the string length of the current string is 4, the string length of the reference string of the current string is 4. It is assumed that pixel values of four pixels in the reference string of the current string are A, B, C, and D respectively. If the current string does not include the unmatched pixel, predicted values of the four pixels in the current string are A, B, C, and D respectively, and the predicted values are the reconstructed values. If the current string includes the unmatched pixel, assuming that the unmatched pixel is the second pixel, a decoder end decodes a pixel value E of the unmatched pixel from the bit stream. By using the reference string, reconstructed values A, E, C, and D of the four pixels in the current string can be obtained.

In a solution with residual coding on an ISC block, a reconstructed value is calculated based on a predicted value and a predicted residual. For example, the predicted value is added to the predicted residual to obtain the reconstructed value.

A string vector of the current string is obtained by decoding when the current string does not include the unmatched pixel. A reference string of the current string is determined based on the string vector of the current string.

A pixel value of the reference string of the current string is determined as a predicted value of the current string. A reconstructed value of the current string is obtained according to the predicted value of the current string and a corresponding predicted residual.

A string vector of the current string is obtained by decoding when the current string includes the unmatched pixel. A reference string of the current string is determined based on the string vector of the current string. The predicted residual of the unmatched pixel in the current string is decoded from the bit stream, and the reconstructed value of the unmatched pixel is obtained according to the predicted residual and the pixel value corresponding to the unmatched pixel in the reference string. A pixel value in the reference string corresponding to the matched pixel in the current string is determined as a predicted value of the matched pixel, and a reconstructed value of the matched pixel is obtained according to the predicted value of the matched pixel and a corresponding predicted residual.

In conclusion, in the technical solution provided in this embodiment of this application, a solution for determining the reconstructed value of the current string is provided for each of the solution without residual coding on the ISC block and the solution with residual coding on the ISC block, which realizes effective decoding in the ISC mode.

Figure 12:
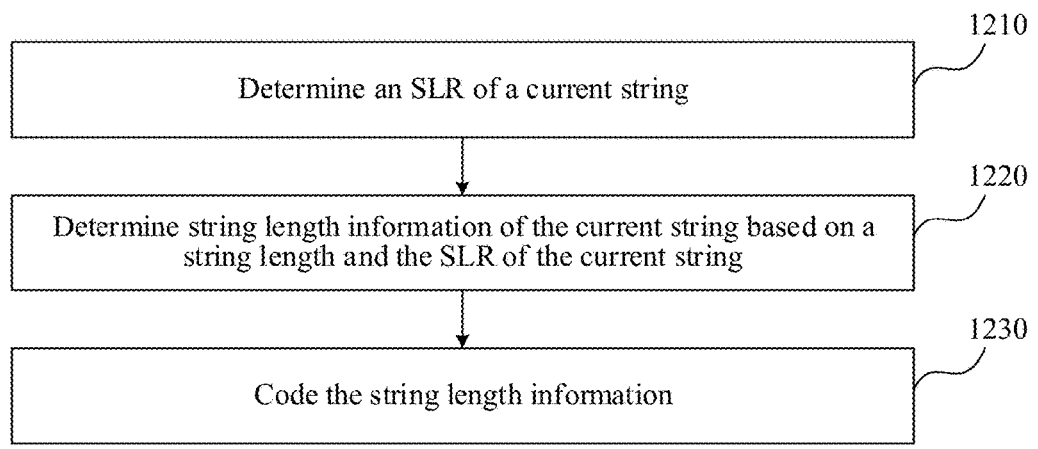
FIG. 12 is a flowchart of a video coding method according to an embodiment of this application.

FIG. 12 is a flowchart of a video coding method according to an embodiment of this application. The method is applicable to a coder-end device. The method may include the following steps (1210 to 1230):

Step 1210: Determine an SLR of a current string.

In an example embodiment, the following example manners of determining the SLR of the current string are provided.

Manner I: The SLR of the current string is a first reference value.

Manner II: SLRs of strings included in an image sequence to which the current string belongs are the same, and the SLR of the current string is coded and then added to a sequence header of the image sequence to which the current string belongs.

Manner III: SLRs of strings included in an image to which the current string belongs are the same, and the SLR of the current string is coded and then added to an image header of the image to which the current string belongs.

Manner IV: SLRs of strings included in a patch to which the current string belongs are the same, and the SLR of the current string is coded and then added to a patch header of the patch to which the current string belongs.

Manner V: SLRs of strings included in an LCU to which the current string belongs are the same, and the SLR of the current string is coded and then added to coding information of the LCU to which the current string belongs.

Manner VI: SLRs of strings included in a CU to which the current string belongs are the same, and the SLR of the current string is coded and then added to coding information of the CU to which the current string belongs.

Manner VII: The SLR of the current string is coded and then added to coding information of the current string.

Manner VIII: The SLR of the current string is determined according to a size of a decoding block to which the current string belongs.

Manner IX: The SLR of the current string is determined according to a color component and a chroma format corresponding to the current string.

Manner X: The SLR of the current string is a second reference value if a number of decoded strings in the CU to which the current string belongs is greater than or equal to a first threshold.

Manner XI: The SLR of the current string is a third reference value if a number of decoded and unmatched pixels in the CU to which the current string belongs is greater than or equal to a second threshold.

Manner XII: The SLR of the current string is a fourth reference value if a number of decoded pixels in the CU to which the current string belongs is less than or equal to the third threshold.

Step 1220: Determine string length information of the current string based on a string length and the SLR of the current string.

The string length information includes information related to the string length of the current string.

In an example embodiment, the string length information includes a string length code of the current string. A decoder end divides the string length of the current string by the SLR to obtain the string length code of the current string.

Step 1230: Code the string length information.

In an example embodiment, the string length information includes a code of a number of remaining pixels in a coding block to which the current string belongs after the current string is coded.

In some embodiments, step 1220 may include the following substeps (1-4):

Step 1: Acquire a total number of pixels of a coding block to which the current string belongs.

Step 2: Acquire a number of coded pixels of the coding block to which the current string belongs.

Step 3: Determine, based on the total number of pixels, the number of decoded pixels, and the string length of the current string, a number of remaining pixels in the coding block to which current string belongs after the current string is coded.

Step 4: Divide the number of remaining pixels after the current string is coded by the SLR to obtain the code of the number of remaining pixels.

In an example embodiment, the string length information includes a remaining string flag, remaining string flag being used for indicating whether the current string is the last string in a coding block to which the current string belongs.

In some embodiments, step 1220 may include the following substeps (5-6):

Step 5: Determine that the remaining string flag corresponding to the current string is a first value when the current string is the last string, the first value being used for indicating that the current string is the last string in the coding block to which the current string belongs; and code the remaining string flag corresponding to current string.

Step 6: Determine the number of remaining pixels of the coding block to which the current string belongs based on the total number of pixels in the coding block to which the current string belongs, the number of coded pixels, and the string length of the current string when the current string is not the last string; divide the number of remaining pixels by the SLR to obtain a code of the number of remaining pixels in the coding block to which current string belongs after the current string is coded; determine that the remaining string flag corresponding to the current string is a second value in, the second value being used for indicating that the current string is not the last string in the coding block to which the current string belongs; and code the remaining string flag corresponding to current string.

The string length information further includes the code of the number of remaining pixels in the coding block to which the current string belongs after the current string is coded; or the string length information further includes the code of the number of remaining pixels in the coding block to which the current string belongs after the current string is coded minus a first value, the first value being 1, for example.

In an example embodiment, the above video coding method further includes: determining an allowable SLR set, the SLR set including at least one set of correspondences between index values and SLRs; and coding a first index value, the first index value being an index value corresponding to the SLR of the current string.

In an example embodiment, the SLR included in the SLR set includes at least one of the following: one or more reference values; a width of a current CU; or a height of the current CU.

In an example embodiment, when the current CU is scanned along a horizontal direction, the SLR set includes the width of the current CU; and when the current CU is scanned along a vertical direction, the SLR set includes the height of the current CU.

In an example embodiment, the above video coding method further includes: coding a string matching flag corresponding to the current string, the string matching flag being used for indicating whether the current string includes an unmatched pixel. When the current string includes the unmatched pixel, the string length of the current string is N, N being the SLR of the current string.

In an example embodiment, when the string length of the current string is greater than N, the current string does not include the unmatched pixel, and the corresponding string matching flag is not required to be coded for the current string; and when the string length of the current string is equal to N, the string matching flag corresponding to the current string is coded; the string matching flag being used for indicating whether the current string includes the unmatched pixel, and N being the SLR of the current string.

In an example embodiment, when the current string includes the unmatched pixel, the above video coding method further includes: coding an unmatched pixel flag included in the current string corresponding to each pixel, the unmatched pixel flag being used for indicating whether the corresponding pixel is an unmatched pixel; or coding a number of unmatched pixels included in the current string, the number being used for determining a location of each unmatched pixel included in the current string; and determining that each pixel included in the current string is an unmatched pixel.

In an example embodiment, the above video coding method further includes the following steps to code a pixel value of each pixel in the current string.

Step 1: Determine a reference string of a current string.
Step 2: Determine a string vector of the current string based on the reference string of the current string.
Step 3: Code the string vector of the current string.

In a solution without residual coding on an ISC block, a predicted value is a reconstructed value. A pixel value of the unmatched pixel in the current string is coded and then added to the bit stream. The pixel value of the unmatched pixel may be directly decoded and restored from the bit stream. A matched pixel in current string is not coded. A pixel value of the matched pixel in the current string may be determined from a reference pixel in the reference string that corresponds to the matched pixel.

In a solution with residual coding on an ISC block, a reconstructed value is calculated based on a predicted value and a predicted residual. For example, the predicted value is added to the predicted residual to obtain the reconstructed value. A predicted residual of the unmatched pixel in the current string is acquired. The predicted residual of the unmatched pixel is coded and then added to the bit stream. The predicted residual of the pixel value of the unmatched pixel may be acquired from the bit stream. The predicted residual is added to a pixel value in the reference string corresponding to the unmatched pixel to obtain the reconstructed value of the unmatched pixel. A matched pixel in current string is not coded.

Further detail regarding the video coding method embodiments may be described with reference to the video decoding method embodiments described herein. Additionally, further detail regarding the video decoding method embodiments may be described with reference to the video coding method embodiments described herein.

In conclusion, in the technical solution provided in this embodiment of this application, the SLR is set, the coding block is partitioned into pixel strings with regular lengths, and then the string length and the SLR are coded into the string length information, which improves uniformity of the pixel strings, and improves coding efficiency of the pixel strings.

The following is an apparatus embodiment of this application, which can be used to perform the method embodiments of this application.

Figure 13:
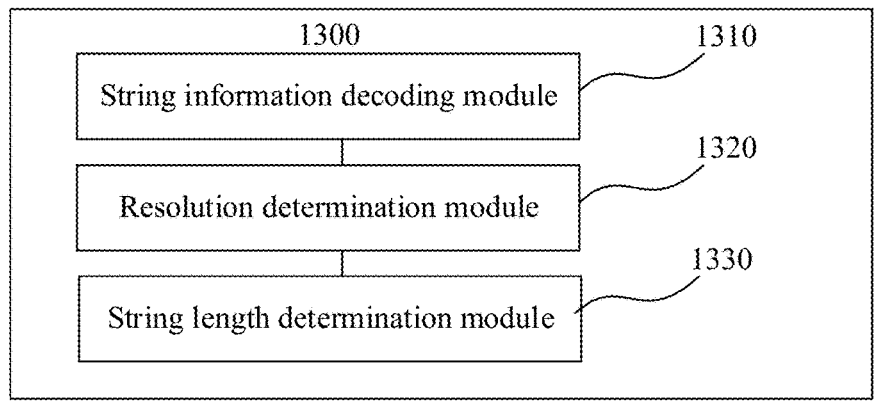
FIG. 13 is a block diagram of a video decoding apparatus according to an embodiment of this application.
Figure 14:
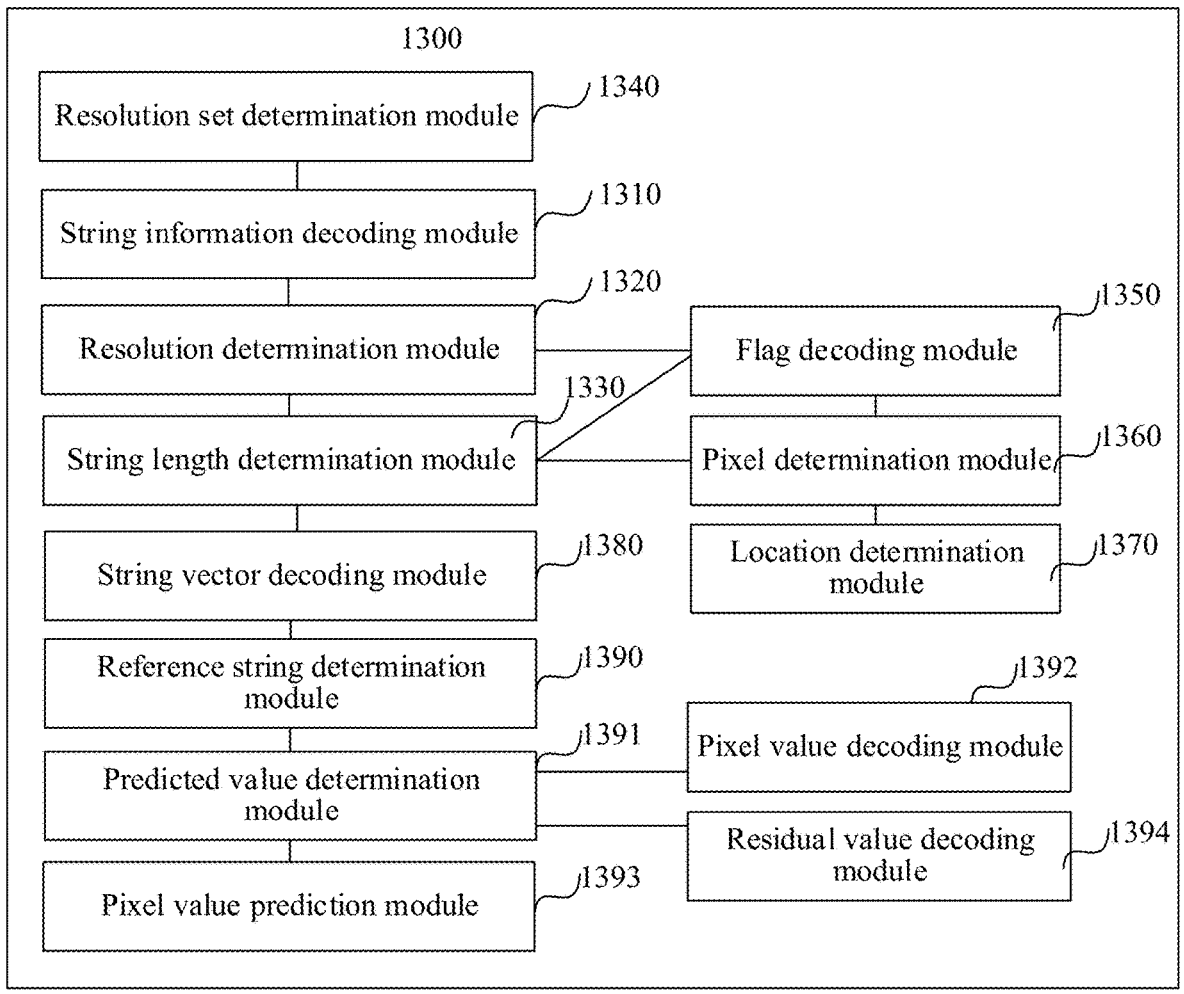
FIG. 14 is a block diagram of a video decoding apparatus according to an embodiment of this application.

FIG. 13 is a block diagram of a video decoding apparatus according to an embodiment of this application. The apparatus has a function of implementing the example of the above video decoding method. The function may be realized by hardware or by executing corresponding software by hardware. The apparatus may be the computer device described above, or may be arranged on the computer device. The apparatus 1300 may include: a string information decoding module 1310, a resolution determination module 1320, and a string length determination module 1330.

The string information decoding module 1310 is configured to decode string length information of a current string from a bit stream, the string length information including information related to a string length of the current string.

The resolution determination module 1320 is configured to determine an SLR of the current string.

The string length determination module 1330 is configured to determine the string length of the current string according to the string length information and the SLR.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In an example embodiment, the resolution determination module 1320 is configured to: determine a first reference value as the SLR of the current string; or decode the SLR of the current string from a sequence header of an image sequence to which the current string belongs, strings included in the image sequence to which the current string belongs having a same SLR; or decode the SLR of the current string from an image header of an image to which the current string belongs, strings included in the image to which the current string belongs having a same SLR; or decode the SLR of the current string from a patch header of a patch to which the current string belongs, strings included in the patch to which the current string belongs having a same SLR; or decode the SLR of the current string from coding information of an LCU to which the current string belongs, strings included in the LCU to which the current string belongs having a same SLR; or decode the SLR of the current string from coding information of a CU to which the current string belongs, strings included in the CU to which the current string belongs having a same SLR; or decode the SLR of the current string from coding information of the current string; or determine the SLR of the current string according to a size of a decoding block to which the current string belongs; or determine the SLR of the current string according to a color component and a chroma format corresponding to the current string; or determine a second reference value as the SLR of the current string when a number of decoded strings in the CU to which the current string belongs is greater than or equal to a first threshold; or determine a third reference value as the SLR of the current string when a number of decoded and unmatched pixels in the CU to which the current string belongs is greater than or equal to a second threshold; or determine a fourth reference value as the SLR of the current string when a number of undecoded pixels in the CU to which the current string belongs is less than or equal to a third threshold.

In an example embodiment, the string length information includes a string length code of the current string. The string length determination module 1330 is configured to multiply the string length code of the current string by the SLR to obtain the string length of the current string.

In an example embodiment, the string length information includes a code of a number of remaining pixels in a decoding block to which the current string belongs after the current string is decoded. The string length determination module 1330 is configured to: acquire a total number of pixels of the decoding block to which the current string belongs; acquire a number of decoded pixels of the decoding block to which the current string belongs; multiply the code of the number of remaining pixels by the SLR to obtain the number of remaining pixels in the decoding block to which the current string belongs after the current string is decoded; and determine the string length of the current string based on the total number of pixels, the number of decoded pixels, and the number of remaining pixels after the current string is decoded.

In an example embodiment, the string length information includes a remaining string flag, the remaining string flag being used for indicating whether the current string is the last string in a decoding block to which the current string belongs. The string length determination module 1330 is configured to: acquire a total number of pixels of the decoding block to which the current string belongs; acquire a number of decoded pixels of the decoding block to which the current string belongs; subtract the number of decoded pixels from the total number of pixels to obtain the string length of the current string when the current string is the last string; acquire a code of a number of remaining pixels in the decoding block to which the current string belongs after the current string is decoded when the current string is not the last string, multiply the code of the number of remaining pixels by the SLR to obtain the number of remaining pixels in the decoding block to which the current string belongs after the current string is decoded; and determine the string length of the current string based on the total number of pixels, the number of decoded pixels, and the number of remaining pixels after the current string is decoded. The string length information further includes the code of the number of remaining pixels in the decoding block to which the current string belongs after the current string is decoded; or the string length information further includes the code of the number of remaining pixels in the decoding block to which the current string belongs after the current string is decoded minus a first value, the first value being 1.

In an example embodiment, the apparatus 1300 further includes a resolution set determination module 1340 configured to determine an allowable SLR set, the SLR set including at least one set of correspondences between index values and SLRs.

The resolution determination module 1320 is configured to: perform decoding to obtain a first index value, the first index value being an index value corresponding to the SLR of the current string; and determine an SLR in the SLR set corresponding to the first index value as the SLR of the current string.

In an example embodiment, the SLR included in the SLR set includes at least one of the following: one or more reference values; a width of a current CU; or a height of the current CU.

In an example embodiment, when the current CU is scanned along a horizontal direction, the SLR set includes the width of the current CU; and when the current CU is scanned along a vertical direction, the SLR set includes the height of the current CU.

In an example embodiment, the apparatus 1300 further includes a flag decoding module 1350 configured to decode a string matching flag corresponding to the current string, the string matching flag being used for indicating whether the current string includes an unmatched pixel.

The string length determination module 1330 is further configured to: determine that the string length of the current string is N when the current string includes the unmatched pixel, N being the SLR of the current string; and perform the operation of determining the string length of the current string according to the string length information and the SLR when the current string does not include the unmatched pixel.

In an example embodiment, the apparatus 1300 further includes a pixel determination module 1360 configured to: determine that the current string does not include an unmatched pixel when the string length of the current string is greater than N; and decode a string matching flag corresponding to the current string when the string length of the current string is equal to N, the string matching flag being used for indicating whether the current string includes the unmatched pixel, N being the SLR of the current string.

In an example embodiment, when the current string includes an unmatched pixel, the apparatus 1300 further includes a location determination module 1370 configured to: decode an unmatched pixel flag included in the current string corresponding to each pixel, the unmatched pixel flag being used for indicating whether the corresponding pixel is an unmatched pixel; perform decoding to obtain a number of unmatched pixels included in the current string and an unmatched pixel location flag of each unmatched pixel, the unmatched pixel location flag being used for indicating a location of the unmatched pixel in the current string; or determine that each pixel included in the current string is an unmatched pixel.

In an example embodiment, the apparatus 1300 further includes a string vector decoding module 1380, a reference string determination module 1390, and a predicted value determination module 1391.

The string vector decoding module 1380 is configured to perform decoding to obtain a string vector of the current string when the current string does not include the unmatched pixel.

The reference string determination module 1390 is configured to determine a reference string of the current string based on the string vector of the current string.

The predicted value determination module 1391 is configured to determine a pixel value of the reference string of the current string as a predicted value of the current string.

In an example embodiment, the apparatus 1300 further includes a string vector decoding module 1380, a reference string determination module 1390, a pixel value decoding module 1392, and a pixel value prediction module 1393.

The string vector decoding module 1380 is configured to perform decoding to obtain a string vector of the current string when the current string includes the unmatched pixel.

The reference string determination module 1390 is configured to determine a reference string of the current string based on the string vector of the current string.

The pixel value decoding module 1392 is configured to decode, from the bit stream, a pixel value of the unmatched pixel in the current string.

The pixel value prediction module 1393 is configured to determine a pixel value in the reference string corresponding to a matched pixel in the current string as a predicted value of the matched pixel.

In an example embodiment, the apparatus 1300 further includes a string vector decoding module 1380, a reference string determination module 1390, a pixel value prediction module 1393, and a residual value decoding module 1394.

The string vector decoding module 1380 is configured to perform decoding to obtain a string vector of the current string when the current string includes the unmatched pixel.

The reference string determination module 1390 is configured to determine a reference string of the current string based on the string vector of the current string.

The residual value decoding module 1394 is configured to: decode, from the bit stream, a predicted residual of the unmatched pixel in the current string; obtain a reconstructed value of the unmatched pixel according to the predicted residual and a pixel value in the reference string corresponding to the unmatched pixel.

The pixel value prediction module 1393 is configured to determine a pixel value in the reference string corresponding to a matched pixel in the current string as a predicted value of the matched pixel.

In conclusion, in the technical solution provided in this embodiment of this application, the reference SLR is first decoded from the string length information in the bit stream, and then the string length of the current string is determined according to the string length information and the SLR. By using the SLR as a division and decoding basis for pixel strings, a length of a pixel string in a coding block can be limited to a multiple of the SLR, which improves uniformity of the pixel strings, so that a decoder end can perform decoding under a condition of memory alignment, thereby improving decoding efficiency of the pixel strings.

In addition, by further setting the limit range of SLR, the decoding efficiency of the pixel strings is further improved.

Moreover, the pre-coded data related to the string length is decoded according to the SLR, so that an amount of decoded data is effectively reduced, thereby improving the decoding efficiency.

Figure 15:
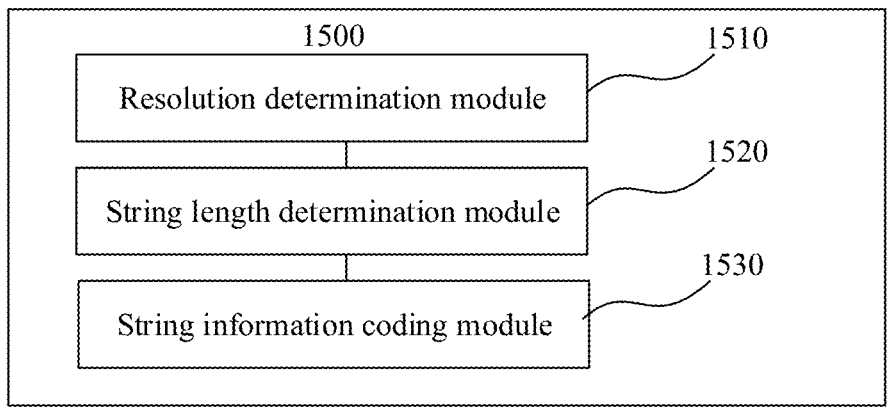
FIG. 15 is a block diagram of a video coding apparatus according to an embodiment of this application.
Figure 16:
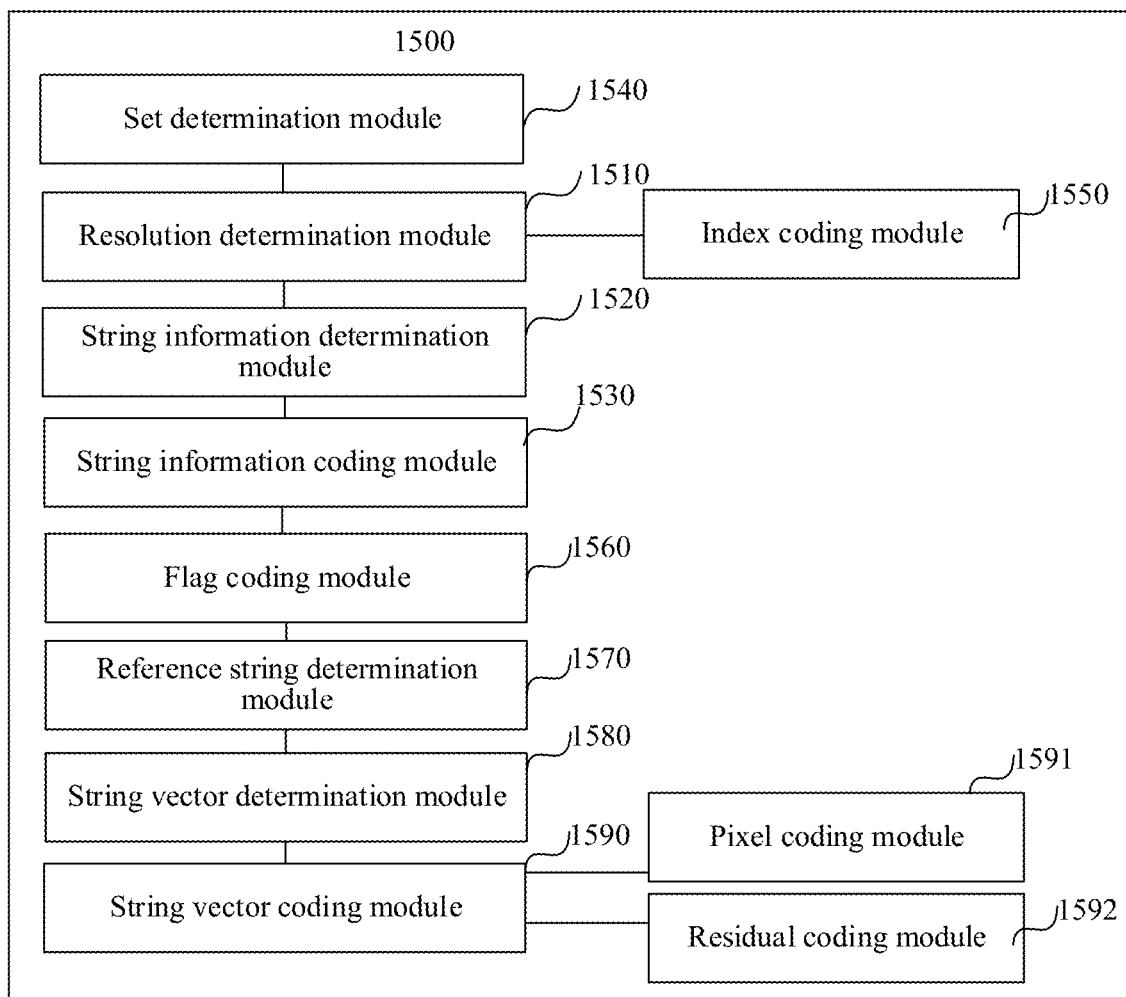
FIG. 16 is a block diagram of a video coding apparatus according to an embodiment of this application.

FIG. 15 is a block diagram of a video coding apparatus according to another embodiment of this application. The apparatus has a function of implementing the example of the above video coding method. The function may be realized by hardware or by executing corresponding software by hardware. The apparatus may be the computer device described above, or may be arranged on the computer device. The apparatus 1500 may include: a resolution determination module 1510, a string information determination module 1520, and a string information coding module 1530.

The resolution determination module 1510 is configured to determine an SLR of a current string.

The string information determination module 1520 is configured to determine string length information of the current string based on a string length and the SLR of the current string, the string length information including information related to the string length of the current string.

The string information coding module 1530 is configured to code the string length information.

In an example embodiment, the SLR of the current string is a first reference value; or SLRs of strings included in an image sequence to which the current string belongs are the same, and the SLR of the current string is coded and then added to a sequence header of the image sequence to which the current string belongs; or SLRs of strings included in an image to which the current string belongs are the same, and the SLR of the current string is coded and then added to an image header of the image to which the current string belongs; or SLRs of strings included in a patch to which the current string belongs are the same, and the SLR of the current string is coded and then added to a patch header of the patch to which the current string belongs; or SLRs of strings included in an LCU to which the current string belongs are the same, and the SLR of the current string is coded and then added to coding information of the LCU to which the current string belongs; or SLRs of strings included in a CU to which the current string belongs are the same, and the SLR of the current string is coded and then added to coding information of the CU to which the current string belongs. The SLR of the current string is coded and then added to coding information of the current string; the SLR of the current string is determined according to a size of a decoding block to which the current string belongs; or the SLR of the current string is determined according to a color component and a chroma format corresponding to the current string; when a number of decoded strings in the CU to which the current string belongs is greater than or equal to a first threshold, the SLR of the current string is a second reference value; or when a number of decoded and unmatched pixels in the CU to which the current string belongs is greater than or equal to a second threshold, the SLR of the current string is a third reference value; or when a number of undecoded pixels in the CU to which the current string belongs is less than or equal to a third threshold, the SLR of the current string is a fourth reference value.

In an example embodiment, the string length information includes a string length code of the current string. The string information determination module 1520 is configured to divide the string length of the current string by the SLR to obtain a string length code of the current string.

In an example embodiment, the string length information includes a code of a number of remaining pixels in a coding block to which the current string belongs after the current string is coded. The string information determination module 1520 is configured to: acquire a total number of pixels of the coding block to which the current string belongs; acquire a number of coded pixels of the coding block to which the current string belongs; determine, based on the total number of pixels, the number of decoded pixels, and the string length of the current string, a number of remaining pixels in the coding block to which the current string belongs after the current string is coded; and divide the number of remaining pixels after the current string is coded by the SLR to obtain the code of the number of remaining pixels.

In an example embodiment, the string length information includes a remaining string flag, the remaining string flag being used for indicating whether the current string is the last string in a coding block to which the current string belongs. The string information determination module 1520 is configured to: determine that the remaining string flag corresponding to the current string is a first value when the current string is the last string, the first value being used for indicating that the current string is the last string in the coding block to which the current string belongs; code the remaining string flag corresponding to the current string; determine the number of remaining pixels of the coding block to which the current string belongs based on the total number of pixels in the coding block to which the current string belongs, the number of coded pixels, and the string length of the current string when the current string is not the last string; divide the number of remaining pixels by the SLR to obtain a code of the number of remaining pixels in the coding block to which the current string belongs after the current string is coded; determine that the remaining string flag corresponding to the current string is a second value in, the second value being used for indicating that the current string is not the last string in the coding block to which the current string belongs; and code the remaining string flag corresponding to the current string. The string length information further includes a code of a number of remaining pixels in a coding block to which the current string belongs after the current string is coded; or the string length information further includes the code of the number of remaining pixels in the coding block to which the current string belongs after the current string is coded minus a first value. For example, the first value is 1.

In an example embodiment, the apparatus 1500 further includes a set determination module 1540 and an index coding module 1550.

The set determination module 1540 is configured to determine an allowable SLR set, the SLR set including at least one set of correspondences between index values and SLRs.

The index coding module 1550 is configured to code a first index value, the first index value being an index value corresponding to the SLR of the current string.

In an example embodiment, the SLR included in the SLR set includes at least one of the following: one or more reference values; a width of a current CU; or a height of the current CU.

In an example embodiment, when the current CU is scanned along a horizontal direction, the SLR set includes the width of the current CU; and when the current CU is scanned along a vertical direction, the SLR set includes the height of the current CU.

In an example embodiment, the apparatus 1500 further includes a flag coding module 1560 configured to code a string matching flag corresponding to the current string, the string matching flag being used for indicating whether the current string includes an unmatched pixel. When the current string includes the unmatched pixel, the string length of the current string is N, N being the SLR of the current string.

In an example embodiment, the apparatus 1500 further includes a flag coding module 1560 configured to: skip coding a string matching flag corresponding to the current string if the string length of the current string is greater than N, which means that the current string does not include the unmatched pixel; and code the string matching flag corresponding to the current string if the string length of the current string is equal to N. The string matching flag is used for indicating whether the current string includes the unmatched pixel, N being the SLR of the current string.

In an example embodiment, the apparatus 1500 further includes a flag coding module 1560 configured to: code an unmatched pixel flag included in the current string corresponding to each pixel, the unmatched pixel flag being used for indicating whether the corresponding pixel is an unmatched pixel; or code a number of unmatched pixels included in the current string and an unmatched pixel location flag of each unmatched pixel, the unmatched pixel location flag being used for indicating a location of the unmatched pixel in the current string; or determine that each pixel included in the current string is an unmatched pixel.

In an example embodiment, the apparatus 1500 further includes a reference string determination module 1570, a string vector determination module 1580, and a string vector coding module 1590.

The reference string determination module 1570 is configured to determine a reference string of the current string when the current string does not include the unmatched pixel.

The string vector determination module 1580 is configured to determine a string vector of the current string based on the reference string of the current string.

The string vector coding module 1590 is configured to code the string vector of the current string.

In an example embodiment, the apparatus 1500 further includes a reference string determination module 1570, a string vector determination module 1580, a string vector coding module 1590, and a pixel coding module 1591.

The reference string determination module 1570 is configured to determine a reference string of the current string when the current string includes the unmatched pixel.

The string vector determination module 1580 is configured to determine a string vector of the current string based on the reference string of the current string.

The string vector coding module 1590 is configured to code the string vector of the current string.

The pixel coding module 1591 is configured to: code a pixel value of the unmatched pixel in the current string and then add the unmatched pixel to the bit stream; and skip coding a matched pixel in the current string.

In an example embodiment, the apparatus 1500 further includes a reference string determination module 1570, a string vector determination module 1580, a string vector coding module 1590, and a residual coding module 1592.

The reference string determination module 1570 is configured to determine a reference string of the current string when the current string includes the unmatched pixel.

The string vector determination module 1580 is configured to determine a string vector of the current string based on the reference string of the current string.

The string vector coding module 1590 is configured to code the string vector of the current string.

The residual coding module 1592 is configured to: acquire a predicted residual of the unmatched pixel in the current string; code a predicted residual of the unmatched pixel and then adding the unmatched pixel to the bit stream; and skip coding a matched pixel in the current string.

In conclusion, in the technical solution provided in this embodiment of this application, the SLR is set, the coding block is partitioned into pixel strings with regular lengths, and then the string length and the SLR are coded into the string length information, which improves uniformity of the pixel strings, and improves coding efficiency of the pixel strings.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. The method embodiments described herein may also describe various implementation examples.

Figure 17:
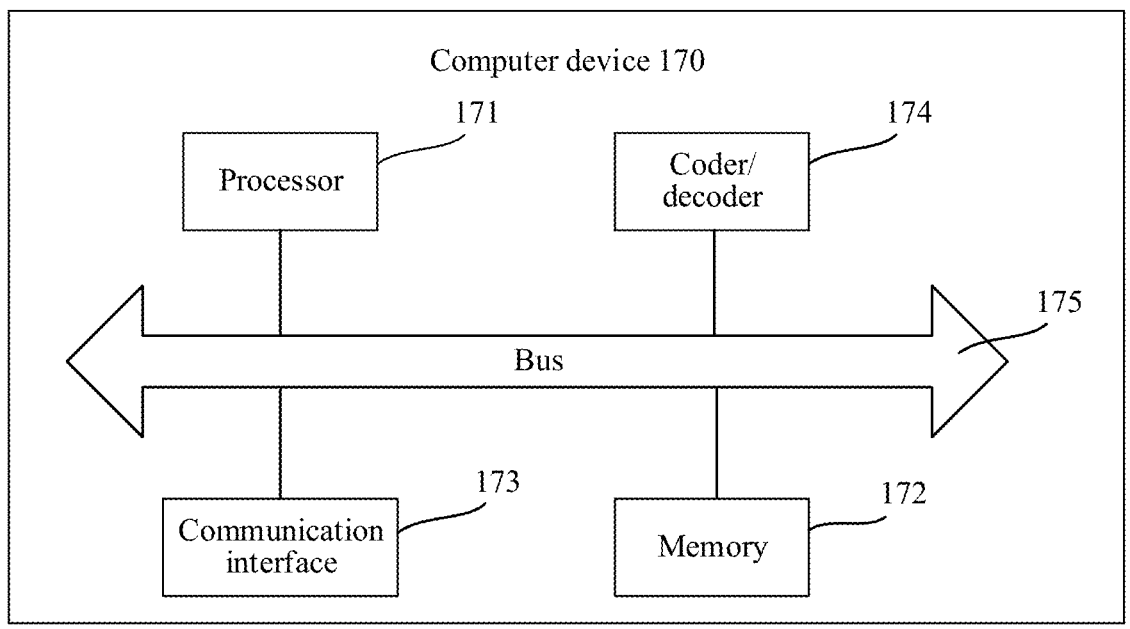
FIG. 17 is a structural block diagram of a computer device according to an embodiment of this application.

FIG. 17 is a structural block diagram of a computer device according to an embodiment of this application. The computer device may be the coder-end device described above or the decoder-end device described above. The computer device 170 may include a processor 171, a memory 172, a communication interface 173, a coder/decoder 174, and a bus 175.

The processor 171 includes one or more processing cores. The processor 171 executes various functional applications and information processing by running software programs and modules.

The memory 172 may be configured to store a computer program, and the processor 171 is configured to execute the computer program, so as to implement the above video decoding method or implement the above video coding method.

The communication interface 173 may be configured to communicate with other devices, for example, receive and transmit audio and video data.

The coder/decoder 174 may be configured to implement coding and decoding functions, for example, code and decode the audio and video data.

The memory 172 is connected to the processor 171 by the bus 175.

In addition, the memory 172 may be implemented by any type of volatile or non-volatile storage device or a combination thereof. The volatile or non-volatile storage device includes but is not limited to a magnetic disk or an optical disk, an electrically erasable programmable read-only memory (EEPROM), an erasable programmable read-only memory (EPROM), a static random-access memory (SRAM), a read-only memory (ROM), a magnetic memory, a flash memory, a programmable read-only memory (PROM).

A person skilled in the art may understand that the structure shown in FIG. 17 is not limited to the computer device 170, and the computer device may include more components or fewer components than those shown in the figure, or some components may be combined, or a different component configuration may be used.

In an example embodiment, a non-transitory computer-readable storage medium is further provided, storing at least one instruction, at least one program, a code set, or an instruction set, the at least one instruction, the at least one program, the code set, or the instruction set, when executed by a processor, implementing the above video decoding method.

In an example embodiment, a non-transitory computer-readable storage medium is further provided, storing at least one instruction, at least one program, a code set, or an instruction set, the at least one instruction, the at least one program, the code set, or the instruction set being loaded and executed by a processor to implement the above video coding method.

In an example embodiment, a computer program product or a computer program is further provided. The computer program product or the computer program includes computer instructions, and the computer instructions are stored in a non-transitory computer-readable storage medium. A processor of a computer device reads the computer instructions from the non-transitory computer-readable storage medium, and executes the computer instructions to cause the computer device to perform the above video decoding method.

In an example embodiment, a computer program product or a computer program is further provided. The computer program product or the computer program includes computer instructions, and the computer instructions are stored in a non-transitory computer-readable storage medium. A processor of a computer device reads the computer instructions from the non-transitory computer-readable storage medium, and executes the computer instructions to cause the computer device to perform the above video coding method.

It is to be understood that "plurality of" mentioned in the description means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects.

The foregoing descriptions are merely examples of the embodiments of this application. Any modification, equivalent replacement, or improvement made without departing from the spirit and principle of this application shall fall within the protection scope of this application.

What is claimed is:

1. A video decoding method, the method comprising:
decoding string length information of a current string from a bit stream, wherein the string length information comprises a string length code of the current string;
determining a string length resolution (SLR) of the current string; and
determining a string length of the current string by multiplying the string length code of the current string by the SLR.

2. The method according to claim 1, wherein the determining the SLR of the current string comprises:
defining the SLR to be a reference value; or
decoding the SLR of the current string from a sequence header of an image sequence, the image sequence comprising the current string and an additional string, the current string and the additional string having a same SLR; or
decoding the SLR of the current string from an image header of an image, the image comprising the current string and an additional string, the current string and the additional string having a same SLR; or
decoding the SLR of the current string from a patch header of a patch, the patch comprising the current string and an additional string, the current string and the additional string having a same SLR; or decoding the SLR of the current string from coding information of a largest coding unit (LCU), the LCU comprising the current string and an additional string, the current string and the additional string having a same SLR; or decoding the SLR of the current string from coding information of a coding unit (CU), the image sequence comprising the current string and an additional string, the current string and the additional string having a same SLR; or decoding the SLR of the current string from coding information of the current string; or determining the SLR of the current string based on a size of a decoding block, the decoding block comprising the current string; or determining the SLR of the current string based on a color component and a chroma format corresponding to the current string; or defining the SLR of the current string to be a reference value when a number of decoded strings in a coding unit is greater than or equal to a threshold, the coding unit comprising the current string; or defining the SLR of the current string to be a reference value when a number of decoded and unmatched pixels in a coding unit is greater than or equal to a threshold, the coding unit comprising the current string; or defining the SLR of the current string to be a reference value when a number of undecoded pixels in the coding unit is less than or equal to a third threshold, the coding unit comprising the current string.

3. The method according to claim 1, the method further comprising:

determining an allowable SLR set, the SLR set comprising at least one set of correspondences between index values and SLRs; and the determining the SLR of the current string comprising:
decoding to obtain a current index value, the current index value being an index value corresponding to the SLR of the current string; and
defining the SLR of the current string to be an SLR in the SLR set corresponding to the current index value.

4. The method according to claim 3, wherein the SLR in the SLR set comprises at least one of: one or more reference values, a width of a current coding unit (CU), or a height of the current CU.

5. The method according to claim 4, wherein
when the current CU is scanned along a horizontal direction, the SLR set comprises the width of the current CU; and
when the current CU is scanned along a vertical direction, the SLR set comprises the height of the current CU.

6. The method according to claim 1, further comprising:
decoding a string matching flag corresponding to the current string, the string matching flag indicating whether the current string comprises an unmatched pixel; and
defining the string length of the current string to be an integer multiple of N when the current string comprises the unmatched pixel, wherein N is the SLR of the current string.

7. The method according to claim 1, the method further comprising:
determining that the current string does not comprise an unmatched pixel when the string length of the current string is greater than N; and decoding a string matching flag corresponding to the current string when the string length of the current string is equal to N, the string matching flag indicating whether the current string comprises the unmatched pixel, wherein N is the SLR of the current string.

8. The method according to claim 1, wherein when the current string comprises an unmatched pixel, the method further comprises:
decoding an unmatched pixel flag of the current string corresponding to each pixel, the unmatched pixel flag indicating whether the corresponding pixel is an unmatched pixel; or
decoding to obtain a number of unmatched pixels of the current string and an unmatched pixel location flag of each unmatched pixel, the unmatched pixel location flag indicating a location of the unmatched pixel in the current string; or
determining that each pixel of the current string is an unmatched pixel.

9. The method according to claim 1, the method further comprising:
decoding to obtain a string vector of the current string when the current string does not comprise an unmatched pixel;
determining a reference string of the current string based on the string vector; and
determining a pixel value of the reference string as a predicted value of the current string.

10. The method according to claim 1, the method further comprising:
decoding to obtain a string vector of the current string when the current string comprises an unmatched pixel;
determining a reference string of the current string based on the string vector;
decoding, from the bit stream, a pixel value of the unmatched pixel; and
determining a pixel value in the reference string corresponding to a matched pixel in the current string as a predicted value of the matched pixel.

11. The method according to claim 1, the method further comprising:
decoding to obtain a string vector of the current string when the current string comprises an unmatched pixel;
determining a reference string of the current string based on the string vector;
decoding, from the bit stream, a predicted residual of the unmatched pixel in the current string;
obtaining a reconstructed value of the unmatched pixel based on the predicted residual and a pixel value in the reference string corresponding to the unmatched pixel; and
determining a pixel value in the reference string corresponding to a matched pixel in the current string as a predicted value of the matched pixel.

12. A computer device, comprising a processor and a memory, the memory storing at least one instruction, at least one program, a code set, or an instruction set, the at least one instruction, the at least one program, the code set, or the instruction set being loaded and executed by the processor to cause the computer device to implement the video decoding method according to claim 1.

13. A non-transitory computer-readable storage medium, storing at least one instruction, at least one program, a code set, or an instruction set, the at least one instruction, the at least one program, the code set, or the instruction set being loaded and executed by a processor to cause a computer to implement the video decoding method according to claim 1.

14. A video decoding method, the method comprising:
decoding string length information of a current string from a bit stream, wherein the string length information comprises a code of a number of remaining pixels in a decoding block after the current string is decoded and the decoding block comprises the current string;
determining a string length resolution (SLR) of the current string; and
determining a string length of the current string by:
acquiring a total number of pixels of the decoding block;
acquiring a number of decoded pixels of the decoding block;
obtaining the number of remaining pixels in the decoding block after the current string is decoded by multiplying the code of the number of remaining pixels and the SLR; and
determining the string length of the current string based on the total number of pixels, the number of decoded pixels, and the number of remaining pixels.

15. The method according to claim 14, wherein the determining the SLR of the current string comprises:
defining the SLR to be a reference value; or
decoding the SLR of the current string from a sequence header of an image sequence, the image sequence comprising the current string and an additional string, the current string and the additional string having a same SLR; or
decoding the SLR of the current string from an image header of an image, the image comprising the current string and an additional string, the current string and the additional string having a same SLR; or
decoding the SLR of the current string from a patch header of a patch, the patch comprising the current string and an additional string, the current string and the additional string having a same SLR; or
decoding the SLR of the current string from coding information of a largest coding unit (LCU), the LCU comprising the current string and an additional string, the current string and the additional string having a same SLR; or
decoding the SLR of the current string from coding information of a coding unit (CU), the image sequence comprising the current string and an additional string, the current string and the additional string having a same SLR; or
decoding the SLR of the current string from coding information of the current string; or
determining the SLR of the current string based on a size of a decoding block, the decoding block comprising the current string; or
determining the SLR of the current string based on a color component and a chroma format corresponding to the current string; or
defining the SLR of the current string to be a reference value when a number of decoded strings in a coding unit is greater than or equal to a threshold, the coding unit comprising the current string; or
defining the SLR of the current string to be a reference value when a number of decoded and unmatched pixels in a coding unit is greater than or equal to a threshold, the coding unit comprising the current string; or
defining the SLR of the current string to be a reference value when a number of undecoded pixels in the coding unit is less than or equal to a third threshold, the coding unit comprising the current string.

16. A non-transitory computer-readable storage medium, storing at least one instruction, at least one program, a code set, or an instruction set, the at least one instruction, the at least one program, the code set, or the instruction set being loaded and executed by a processor to cause a computer to implement the video decoding method according to claim 14.

17. The method according to claim 14, the method further comprising:
determining an allowable SLR set, the SLR set comprising at least one set of correspondences between index values and SLRs; and
the determining the SLR of the current string comprising:
decoding to obtain a current index value, the current index value being an index value corresponding to the SLR of the current string; and
defining the SLR of the current string to be an SLR in the SLR set corresponding to the current index value.

18. A video decoding method, the method comprising:
decoding string length information of a current string from a bit stream, wherein the string length information comprises a remaining string flag, the remaining string flag indicating whether the current string is a last string in a decoding block and the decoding block comprises the current string;
determining a string length resolution (SLR) of the current string; and
determining a string length of the current string by:
acquiring a total number of pixels of the decoding block;
acquiring a number of decoded pixels of the decoding block;
subtracting, when the current string is the last string, the number of decoded pixels from the total number of pixels to determine the string length of the current string;
acquiring, when the current string is not the last string, a code of a number of remaining pixels in the decoding block after the current string is decoded, multiplying the code of the number of remaining pixels by the SLR to obtain the number of remaining pixels in the decoding block; and determining the string length of the current string based on the total number of pixels, the number of decoded pixels, and the number of remaining pixels after the current string is decoded; and
wherein the string length information further comprises the code of the number of remaining pixels in the decoding block after the current string is decoded or the code of the number of remaining pixels in the decoding block after the current string is decoded minus a value.

19. The method according to claim 18, wherein the determining the SLR of the current string comprises:
defining the SLR to be a reference value; or
decoding the SLR of the current string from a sequence header of an image sequence, the image sequence comprising the current string and an additional string, the current string and the additional string having a same SLR; or
decoding the SLR of the current string from an image header of an image, the image comprising the current string and an additional string, the current string and the additional string having a same SLR; or
decoding the SLR of the current string from a patch header of a patch, the patch comprising the current string and an additional string, the current string and the additional string having a same SLR; or decoding the SLR of the current string from coding information of a largest coding unit (LCU), the LCU comprising the current string and an additional string, the current string and the additional string having a same SLR; or decoding the SLR of the current string from coding information of a coding unit (CU), the image sequence comprising the current string and an additional string, the current string and the additional string having a same SLR; or decoding the SLR of the current string from coding information of the current string; or determining the SLR of the current string based on a size of a decoding block, the decoding block comprising the current string; or determining the SLR of the current string based on a color component and a chroma format corresponding to the current string; or defining the SLR of the current string to be a reference value when a number of decoded strings in a coding unit is greater than or equal to a threshold, the coding unit comprising the current string; or defining the SLR of the current string to be a reference value when a number of decoded and unmatched pixels in a coding unit is greater than or equal to a threshold, the coding unit comprising the current string; or defining the SLR of the current string to be a reference value when a number of undecoded pixels in the coding unit is less than or equal to a third threshold, the coding unit comprising the current string.

20. A non-transitory computer-readable storage medium, storing at least one instruction, at least one program, a code set, or an instruction set, the at least one instruction, the at least one program, the code set, or the instruction set being loaded and executed by a processor to cause a computer to implement the video decoding method according to claim 18.

* * * * *